United States Patent
Yoshikawa

(10) Patent No.: US 9,318,250 B2
(45) Date of Patent: Apr. 19, 2016

(54) REACTOR, CONVERTER, AND POWER CONVERTER APPARATUS

(75) Inventor: Kouhei Yoshikawa, Osaka (JP)

(73) Assignee: Sumitomo Electric Industries, Ltd., Osaka-shi (JP)

(*) Notice: Subject to any disclaimer, the term of this patent is extended or adjusted under 35 U.S.C. 154(b) by 28 days.

(21) Appl. No.: 14/116,747

(22) PCT Filed: Apr. 20, 2012

(86) PCT No.: PCT/JP2012/060668
§ 371 (c)(1),
(2), (4) Date: Jan. 24, 2014

(87) PCT Pub. No.: WO2012/153618
PCT Pub. Date: Nov. 15, 2012

(65) Prior Publication Data
US 2014/0133204 A1 May 15, 2014

(30) Foreign Application Priority Data

May 10, 2011 (JP) .................................. 2011-104924
Feb. 28, 2012 (JP) .................................. 2012-042247

(51) Int. Cl.
*H01F 27/02* (2006.01)
*H01F 27/06* (2006.01)
(Continued)

(52) U.S. Cl.
CPC ................ *H01F 27/02* (2013.01); *H01F 27/06* (2013.01); *H01F 27/08* (2013.01); *H01F 27/402* (2013.01); *H01F 37/00* (2013.01); *H02M 3/158* (2013.01); *H02M 7/537* (2013.01); *H01F 27/306* (2013.01)

(58) Field of Classification Search
CPC ......................................... H01F 27/00–27/30

USPC ........... 336/65, 83, 90, 92, 96, 196, 198, 192, 336/233–234
IPC ...................................... H01F 5/00,27/24, 27/30
See application file for complete search history.

(56) References Cited

U.S. PATENT DOCUMENTS 3,891,954 A    6/1975  Konishi
5,281,940 A *  1/1994  Goto .............................. 335/282
(Continued)

FOREIGN PATENT DOCUMENTS

JP    S56-155521 A     12/1981
JP    2005-108976 A     4/2005
(Continued)

OTHER PUBLICATIONS

Office Action issued in U.S. Appl. No. 14/116,729 dated Apr. 29, 2015.
(Continued)

*Primary Examiner* — Tuyen Nguyen
(74) *Attorney, Agent, or Firm* — Venable LLP; Michael A. Sartori; F. Brock Riggs

(57) ABSTRACT

A reactor 1 of the present invention includes a coil 2, a magnetic core 3 at which the coil 2 is disposed, and a case 4 storing a combined product 10 made up of the coil 2 and the magnetic core 3. The case 4 includes a bottom plate portion and a side wall portion 41A surrounding the combined product 10. The side wall portion 41A is made of an insulating resin. A hook portion 43a on which a line 71, which is coupled to a sensor 7 for measuring the physical quantity of the reactor 1, such as a temperature sensor, is hooked is integrally molded with the side wall portion 41A by the resin structuring the side wall portion 41A. Allowing the line 71 to be hooked on the hook portion 43a and fixed thereto, the sensor 7 can be prevented from being displaced or coming off because of the line 71 being pulled or the like. Thus, the sensor 7 can be maintained at a proper position.

11 Claims, 10 Drawing Sheets

(51) Int. Cl.
  *H01F 27/08* (2006.01)
  *H01F 37/00* (2006.01)
  *H01F 27/40* (2006.01)
  *H02M 3/158* (2006.01)
  *H02M 7/537* (2006.01)
  *H01F 27/30* (2006.01)

(56) References Cited

U.S. PATENT DOCUMENTS

| | | |
|---|---|---|
| 2009/0027151 A1 | 1/2009 | Nakatsu et al. |
| 2009/0108971 A1 | 4/2009 | Okamoto |
| 2010/0026434 A1 | 2/2010 | Okamoto et al. |
| 2010/0226410 A1 | 9/2010 | Maeno et al. |
| 2011/0156853 A1* | 6/2011 | Kato .................. H01F 27/306 336/192 |
| 2014/0085026 A1* | 3/2014 | Yamada et al. ............... 336/90 |

FOREIGN PATENT DOCUMENTS

| | | |
|---|---|---|
| JP | 2007-311403 A | 11/2007 |
| JP | 2009-099596 A | 5/2009 |
| JP | 2009-267360 A | 11/2009 |
| JP | 2010-186766 A | 8/2010 |
| JP | 2010-203998 A | 9/2010 |
| JP | 2010-245458 A | 10/2010 |
| JP | 2010-272771 A | 12/2010 |
| JP | 4952963 B1 | 6/2012 |

OTHER PUBLICATIONS

International Search Report in PCT International Application No. PCT/JP2012/060668, dated Jul. 24, 2012.
International Search Report in PCT International Application No. PCT/JP2012/060670, dated Jul. 24, 2012.
U.S. Appl. No. 14/116,729, filed Nov. 8, 2013.
Notification of the First Office Action in Chinese Patent Application No. 201280022084.8, dated Jul. 30, 2015.
Notification of the First Office Action in Chinese Patent Application No. 201280021939.5, dated Jul. 30, 2015.

* cited by examiner

REACTOR, CONVERTER, AND POWER CONVERTER APPARATUS

TECHNICAL FIELD

The present invention relates to a reactor used as a constituent component of a power converter apparatus, such as an in-vehicle DC-DC converter mounted on a vehicle such as a hybrid vehicle, a converter including the reactor, and a power converter apparatus including the converter. In particular, the present invention relates to a reactor with which a sensor for measuring the physical quantity (temperatures, current values and the like) of the reactor can be maintained at a proper position.

BACKGROUND ART

A reactor is one of the components of a circuit that performs a voltage step-up or step-down operation. Patent Literatures 1 and 2 disclose a reactor used for a converter mounted on a vehicle such as a hybrid vehicle. The reactor includes, for example: a coil having a pair of coil elements; an annular magnetic core at which the coil is disposed and which forms a closed magnetic path; a case storing a combined product made up of the coil and the magnetic core; and a sealing resin (secondary resin portion, potting resin) packed in the case.

When the coil generates heat upon energization, the loss of the reactor becomes great because of the heat. Accordingly, in general, the reactor is used as being fixed to an installation target such as a cooling base such that the coil can be cooled. Further, it is discussed to dispose a sensor for measuring the physical quantity such as temperatures or current at the place near the reactor when the reactor is used, to control current or the like supplied to the coil in accordance with the measured temperature or current, for example. Patent Literature 1 discloses disposition of a current sensor at the magnetic core. Patent Literature 2 discloses disposition of a temperature sensor between the coil elements.

CITATION LIST

Patent Literatures

Patent Literature 1: Japanese Unexamined Patent Publication No. 2009-267360
Patent Literature 2: Japanese Unexamined Patent Publication No. 2010-245458

SUMMARY OF INVENTION

Technical Problem

In order to properly measure the physical quantity, it is desired that the disposition position of the sensor is maintained after the sensor is disposed at any prescribed position. However, conventionally, the structure for maintaining the position of the sensor is not fully discussed.

To the sensor, a line (see Patent Literature 1) for transmitting measured information to an external apparatus, such as a control apparatus, is attached. In the mode where a sealing resin is included, the position of the sensor and the line located near the sensor can be fixed by the sealing resin. However, the sensor can be damaged by receiving an excessive force, for example when the line is excessively pulled during installation of the reactor. If the sensor is damaged, the physical quantity cannot be properly measured. In particular, when the line has a redundant length, it is highly possible that the line is pulled.

Further, even in the mode where the sealing resin is included, by the line being pulled before the sealing resin is packed, the position of the sensor may be displaced. In the worst case, the sensor may come off. Hence, the sensor may be fixed in the state where it is disposed at an improper position.

On the other hand, with a reactor having no sealing resin, the sensor and the line cannot be fixed. Therefore, in manufacturing or installing the reactor, the sensor tends to be displaced or come off because of the routing of the line, as described above. For example, the line may be fixed to the case by an adhesion tape or any appropriate jig. However, in this case, an increase in the number of components is invited.

Under the circumstances described above, irrespective of presence of the sealing resin, it is desired to develop a structure that can restrict the line from shifting, in order to prevent the sensor from being displaced or coming off because of routing of the line so as to maintain the state where the sensor is disposed at a proper position.

Accordingly, an object of the present invention is to provide a reactor with which a sensor for measuring the physical quantity of the reactor can be maintained at a proper position.

Solution to Problem

The present invention achieves the object stated above by employing a particular material for part of the case, and employing the structure in which a hook portion on which the line of the sensor is hooked is integrally molded with the case by this particular material. Note that, in the present specification, "to integrally mold" means to mold one member together with other member. On the other hand, "to integrate" means to couple one member and other separate member to each other.

A reactor of the present invention includes: a coil; a magnetic core at which the coil is disposed; and a case that stores a combined product made up of the coil and the magnetic core. The case includes a bottom plate portion on which the combined product is placed and a side wall portion that surrounds the combined product. At least part of the side wall portion on an opening side is made of resin. Then, a hook portion on which a line coupled to a sensor for measuring the physical quantity of the reactor is hooked is integrally molded with the side wall portion by the resin structuring the side wall portion.

With the reactor of the present invention, allowing the line of the sensor to be hooked on the hook portion provided at the side wall portion, the line can be fixed to the case, and the line can be restricted from shifting. Accordingly, with the reactor of the present invention, the possibility of occurrence of displacement, coming off, or damage of the sensor due to an excessive routing of the line during manufacture or installation of the reactor can be reduced or eliminated. Accordingly, the reactor of the present invention can maintain the state where the sensor is disposed at a prescribed position for a long period. Thus, a desired physical quantity can be properly measured by the sensor disposed at such a prescribed position.

Further, since the hook portion is integrally molded with the side wall portion, an increase in the number of components will not be invited. Further, since the hook portion is made of resin, even when it is in a complicated shape, it can be integrally molded with ease when at least part of the side wall portion is formed through injection molding or the like, and it can be formed with ease as compared to the case where the hook portion is made of a metal material. Furthermore, since the hook portion is provided on the opening side of the side wall portion, one end of the line can be drawn outside of the case with ease. Accordingly, the line can be connected to an external apparatus such as a control apparatus or the like with ease. Still further, when the reactor of the present invention includes a sealing resin, allowing the line to be hooked on the hook portion in advance, the line becomes less likely to become an obstacle when the sealing resin is packed. Thus, the packing work is facilitated. Thanks to the features noted above, the reactor of the present invention also exhibits excellent productivity.

Moreover, since the reactor of the present invention includes the case, the combined product can be protected from the external environment and can be mechanically protected.

In particular, in the mode where the reactor of the present invention includes a sealing resin, allowing the sensor to be disposed at a prescribed position and the line to be hooked on the hook portion before sealing is performed, the sensor can be maintained at a prescribed position and this state can be fixed by the sealing resin. Accordingly, in this mode, the disposition position of the sensor can be more surely maintained.

The sensor may be, for example, a temperature sensor for measuring the temperature of the coil, or a current sensor for measuring the current that flows through the coil. The temperature sensor may include those having a heat sensitive element, such as thermistor, thermocouple, pyroelectric element and the like. The current sensor may include those having an element that can measure current by the physical quantity based on the magnetic field, such as a Hall element, a magnetoresistance element (an MR element), a magneto-impedance element (an MI element), a search coil and the like.

In one mode of the present invention, the side wall portion is entirely made of an insulating resin. The side wall portion is a member independent of the bottom plate portion. The side wall portion is integrated with the bottom plate portion through a fixation member. Further, in one mode of the present invention, the bottom plate portion is made of a metal material.

In this mode, since the side wall portion is entirely made of an insulating resin, the coil and the side wall portion can be insulated from each other. Accordingly, by disposing the coil and the side wall portion in close proximity to each other, a reactor being small in size can be obtained. Further, since the bottom plate portion and the side wall portion are separate members, they can be manufactured separately. Thus, in this mode, the manufacture manner is greatly flexible and the constituent materials can be selected from a wider range. Representatively, the bottom plate portion and the side wall portion can be made of different materials. In particular, when the bottom plate portion to which the combined product is brought into contact or arranged closely in the case is made of a metal material such as aluminum, the bottom plate portion can be used as a heat dissipation path. Thus, a reactor possessing an excellent heat dissipating characteristic can be obtained. Further, in this case, since the side wall portion is made of resin which is generally lighter than a metal material, a case being lighter than a conventional aluminum case can be obtained. Hence, a lightweight reactor can be obtained. Further, in this mode, since the side wall portion and the bottom plate portion can be integrated with each other after the combined product is disposed at the bottom plate portion, excellent assemblability is also exhibited with the reactor.

In one mode of the present invention, the combined product may include an insulator interposed between the coil and the magnetic core. The insulator may be integrally structured by a pair of divided pieces being combined. A space formed as a result of the divided pieces being combined may be included as a storage portion for the sensor.

Thanks to provision of the insulator, in this mode, insulation between the coil and the magnetic core can be enhanced. Further, since the insulator is structured by the divided pieces, in particular by the divided pieces that can be divided in the axial direction of the coil, the insulator can be disposed at the magnetic core or the like with ease. Hence, this mode also provides excellent assemblability of the reactor. Further, in this mode, since the insulator includes the storage portion for the sensor, the sensor can be disposed more surely at a prescribed position, and an increase in the number of components because of provision of the storage portion will not be invited. Further, since the storage portion holds the sensor, in this mode, it is easier to prevent displacement of the sensor. In this mode, the divided pieces are structured such that the in-contact place and the out-of-contact place are formed at the places where the divided pieces oppose to each other when the divided pieces are combined. Then, this space formed by the out-of-contact place should be used as the storage portion.

In the mode where the insulator includes the divided pieces, the coil may include a pair of coil elements. The coil elements may be juxtaposed to each other such that the axes of the coil elements are in parallel to each other. Here, each of the divided pieces of the insulator may be integrally molded with a partition portion disposed between the coil elements. The storage portion for the sensor may be a space formed by the partition portions of the divided pieces when the divided pieces are combined.

In this mode, since the partition portion made of an insulating material (representatively an insulating resin) structuring the insulator is interposed between the coil elements, isolation between the coil elements can be secured. Furthermore, in this mode, since the partition portion integrally molded with the insulator structures the storage portion for the sensor, an increase in the number of components because of provision of the storage portion will not be invited. Since the storage portion can hold the sensor, the sensor is easily prevented from being displaced. Further, since the partition portion is disposed between the coil elements, the sensor is disposed between the coil elements likewise. Here, when the sensor is a temperature sensor, since the sensor can be disposed between the coil elements where the temperature tends to rise, the temperature of the coil can be measured properly in this mode.

In the mode in which the insulator includes the divided pieces, the divided pieces may have engaging portions that engage with each other.

In this mode, the divided piece can be positioned relative to each other by the engaging portions when the divided pieces are combined with each other. Hence, excellent assemblability of the reactor is achieved. Further, since the divided pieces are combined relative to each other at the proper position, in this mode, the storage portion for the sensor can be formed properly. Allowing the sensor to be disposed at this storage portion, the sensor can be disposed at a prescribed position.

In one mode of the present invention, the storage portion of the sensor may be integrally molded with the side wall portion by the resin forming the side wall portion.

In this mode also, provision of the storage portion facilitates the sensor to be held at a prescribed position. In particular, in this mode, since the storage portion is integrally molded with the side wall portion, the storage portion can be formed at the same time when the side wall portion is molded through injection molding or the like. Thus, excellent productivity of the reactor is exhibited. Further, likewise this mode does not invite an increase in the number of components because of provision of the storage portion.

Furthermore, as one mode of the present invention, a joining layer formed at one face of the bottom plate portion may be included. The coil may be fixed to the bottom plate portion.

In this mode, since just the joining layer is interposed between the coil and the bottom plate portion, the interval between the bottom face of the case and the coil is small. Thus, a reactor being small in size can be obtained. Further, in this mode, since the coil is fixed to the bottom plate portion by the joining layer, the coil can be fixed to a prescribed position with reference to the case, irrespective of the presence of the sealing resin. In particular, in this mode, when the bottom plate portion and the side wall portion are separate members, the joining layer can be formed while the side wall portion is removed. Hence, formation work of the joining layer is facilitated, and excellent workability is exhibited.

In the mode including the joining layer, the joining layer may have a multilayer structure including a heat dissipation layer and an adhesive layer made of an insulation adhesive agent. Further, the bottom plate portion may be made of an electrically conductive material. The adhesive layer is disposed on the side being brought into contact with the coil, and the heat dissipation layer is disposed on the side being brought into contact with the bottom plate portion.

In this mode, the bottom plate portion is made of an electrically conductive material (a metal material, which generally exhibits excellent thermal conductivity, such as aluminum). Furthermore, the coil can be fully fixed to the bottom plate portion by the adhesive layer. In addition, the heat dissipation layer is included. Accordingly, heat from the coil can be transferred efficiently to an installation target such as a cooling base via the heat dissipation layer and the bottom plate portion. Accordingly, this mode provides an excellent heat dissipating characteristic irrespective of the presence of the sealing resin or the material of the sealing resin. Further, since the adhesive layer being brought into contact with the coil is made of an insulating material, the coil and the bottom plate portion can be insulated from each other even when the heat dissipation layer and the bottom plate portion are made of an electrically conductive material. Accordingly, the joining layer including the heat dissipation layer can be reduced in thickness. From this feature also, this mode provides an excellent heat dissipating characteristic and achieves a reduction in size.

In the mode of the multilayer structure in which the joining layer includes the adhesive layer and the heat dissipation layer, at least part of the heat dissipation layer may be made of a material whose thermal conductivity is more than 2 W/m·K.

Since at least part of the heat dissipation layer is made of a material of such high thermal conductivity, this mode can provide a reactor possessing an even better heat dissipation characteristic.

In the mode of the multilayer structure in which the joining layer includes the adhesive layer and the heat dissipation layer, the heat dissipation layer may be made of an epoxy base adhesive agent containing an alumina filler, and the bottom plate portion may be made of aluminum or aluminum alloy.

Thanks to provision of the heat dissipation path structured by the heat dissipation layer and the bottom plate portion, this mode exhibits an excellent heat dissipating characteristic. Further, this mode also exhibits excellent insulation between the bottom plate portion and the coil because the heat dissipation layer is made of an insulation adhesive agent. Therefore, the thickness of the heat dissipation layer can be reduced. Hence, an improvement in both the heat dissipating characteristic and the insulation, and a reduction in size can be achieved.

In the mode where the side wall portion and the bottom plate portion are independent members, the thermal conductivity of the bottom plate portion is equal to or higher than the thermal conductivity of the side wall portion.

Since the bottom plate portion where the coil is disposed possesses an excellent heat dissipating characteristic, heat of the coil can be efficiently transferred to the installation target via the bottom plate portion. Thus, this mode can provide an excellent heat dissipating characteristic. More specifically, the bottom plate portion may be made of a metal material, and the side wall portion may be made of resin such as an insulating resin.

The reactor of the present invention can be suitably used as a constituent component of a converter. The converter of the present invention may include a switching element, a driver circuit controlling an operation of the switching element, and a reactor smoothing a switching operation. By the operation of the switching element, an input voltage may be converted. The reactor may be the reactor of the present invention. The converter of the present invention can be suitably used as a constituent component of a power converter apparatus. The power converter apparatus of the present invention may include a converter converting an input voltage, and an inverter connected to the converter to perform interconversion between a direct current and an alternating current. A load may be driven by power obtained by the conversion of the inverter. The converter may be the converter of the present invention.

Since the converter of the present invention and the power converter apparatus of the present invention include the reactor of the present invention with which any physical quantity can be stably measured by a sensor, control in accordance with the measured physical quantity or the like can be performed in an excellent manner.

Advantageous Effect of Invention

The reactor of the present invention can maintain a sensor for measuring physical quantity such as temperatures at a proper position.

DESCRIPTION OF EMBODIMENTS

First Embodiment

Figure 1:
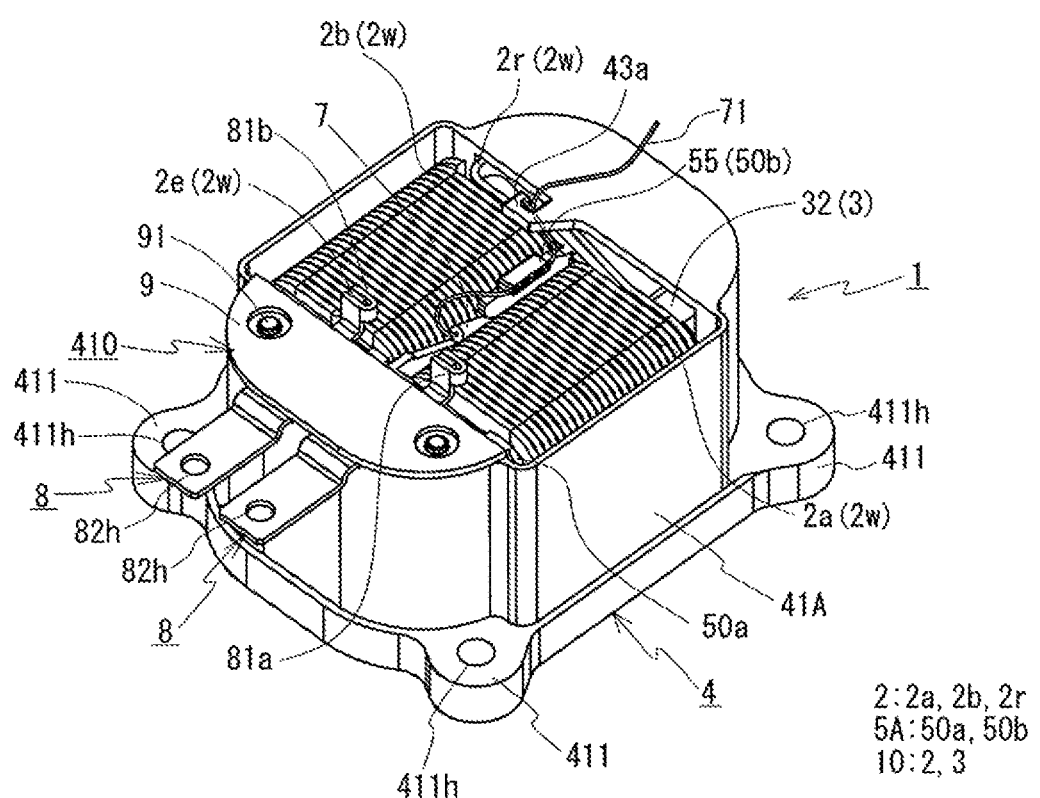
FIG. 1 is a schematic perspective view showing a reactor according to a first embodiment.

In the following, with reference to FIGS. 1 to 4, a description will be given of a reactor of a first embodiment. Identical reference symbols in the drawings denote identically named elements. Note that, the following description is given on the premise that the side becoming the installed side when the reactor is installed is the bottom side and the side being opposite thereto is the top side.

<<Overall Structure of Reactor>>

A reactor 1 includes a coil 2, a magnetic core 3 at which the coil 2 is disposed, and a case 4 storing a combined product 10 made up of the coil 2 and the magnetic core 3. The case 4 is a box-like element including a bottom plate portion 40 (FIG. 2) and a side wall portion 41A standing upright from the bottom plate portion 40, and the side opposing to the bottom plate portion 40 is open. The reactor 1 is best characterized by the following points: the side wall portion 41A of the case 4 is made of resin; and a hook portion 43a, on which a line 71 coupled to a sensor 7 measuring the physical quantity of the reactor 1 is hooked, is integrally molded with the side wall portion 41A by the resin forming the side wall portion 41A. In the following, each of the structures will be described in more detail.

[Sensor]

Figure 4:
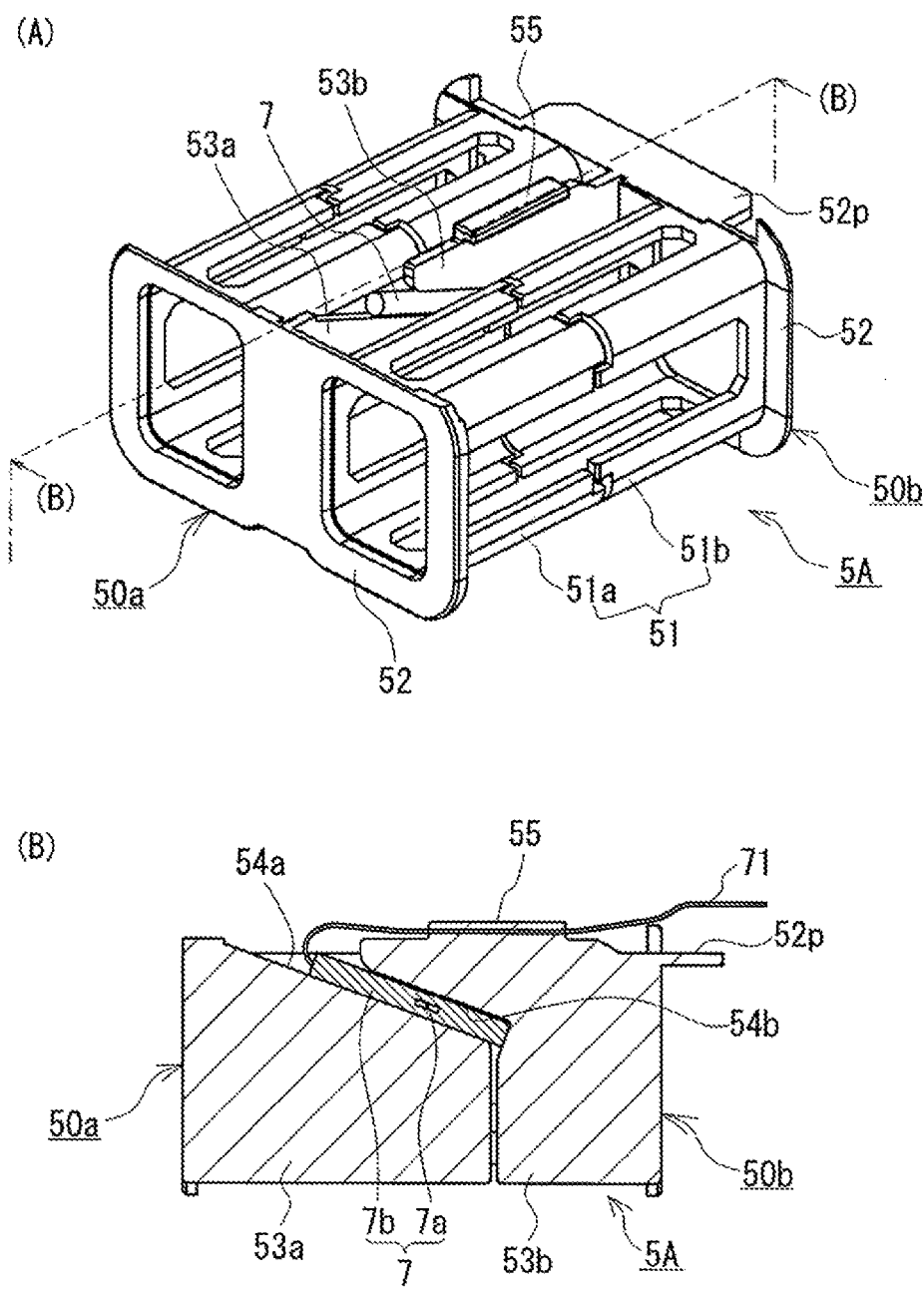
FIG. 4 shows an insulator included in the reactor according to the first embodiment, in which (A) is a perspective view and (B) is a cross-sectional view taken along B-B in (A).

Here, the sensor 7 is a temperature sensor. As shown in FIG. 4 (B), the sensor 7 may be a rod-like element including a heat sensitive element 7a such as a thermistor, and a protective portion 7b that protects the heat sensitive element 7a. The protective portion 7b may be a tube made of resin or the like. To the sensor 7, the line 71 (FIG. 1, FIG. 4 (B)) for transmitting sensed information to an external apparatus such as a control apparatus is coupled.

[Coil]

A description will be given of the coil 2 with reference chiefly to FIGS. 2 and 3. The coil 2 includes a pair of coil elements 2a and 2b made of a single continuous wire 2w with no joining portion being spirally wound, and a coil couple portion 2r coupling the coil elements 2a and 2b. The coil elements 2a and 2b are hollow sleeve-like elements with identical number of turns. The coil elements 2a and 2b are juxtaposed (laterally juxtaposed) to each other such that their respective axial directions are in parallel to each other. On the other end side (on the right side in FIG. 3) of the coil 2, the wire 2w is partially bent in a U-shape, to form the coil couple portion 2r. With this structure, the winding direction of the coil elements 2a and 2b are identical to each other's.

Note that, the coil elements can be made of separate wires. The one ends of the wires of the coil elements may be joined through welding, soldering, fixation under pressure and the like to obtain a coil.

The wire 2w is suitably a coated wire, which includes a conductor made of an electrically conductive material such as copper or aluminum, or alloy thereof, the conductor being provided with an insulating coat made of an insulating material around its outer circumference. The thickness of the insulating coat is preferably 20 µm or more and 100 µm or less. As the thickness is greater, the pinholes become fewer, whereby the electrical insulating characteristic is enhanced. The conductor is representatively a rectangular wire. Alternatively, the conductor of various shapes can be used, such as those having a circular, elliptical, or polygonal cross section. The rectangular wire has the following advantages: (1) a coil being high in space factor can be formed with ease as compared to use of a round wire having a circular cross-section; (2) the wider contact area relative to a joining layer 42 included in the case 4, whose description will be given later, can be secured with ease; and (3) the wider contact area relative to terminal fittings 8, whose description will be given later, can be secured with ease. Here, a coated rectangular wire whose conductor is a copper-made rectangular wire and whose insulating coat is enamel (representatively, polyamide-imide) is used. The coil elements 2a and 2b are each an edgewise coil made of the coated rectangular wire being wound edgewise. Further, though the end face shape of the coil elements 2a and 2b herein is a rectangular shape with rounded corners, it can be circular or the like.

The opposite end portions 2e of the wire 2w forming the coil 2 are extended as appropriate from the turn forming portion at one end side (the left side in FIG. 3) of the coil 2, and representatively drawn outside of the case 4 (FIG. 1). The opposite end portions 2e of the wire have the conductor portions exposed by the insulating coat being peeled off. To the exposed conductor portions, the terminal fittings 8 made of an electrically conductive material are connected. Via the terminal fittings 8, an external apparatus (not shown) such as a power supply supplying power to the coil 2 is connected.

[Magnetic Core]

A description will be given of the magnetic core 3 with reference to FIG. 3. The magnetic core 3 includes a pair of inner core portions 31 covered by the coil elements 2a and 2b, and a pair of outer core portions 32 around which no coil 2 is disposed and hence exposed outside the coil 2. The inner core portions 31 are each a columnar element (here, in a rectangular parallelepiped shape with rounded corners), with an outer shape conforming to the inner circumferential shape of corresponding one of the coil elements 2a and 2b. The outer core portions 32 are each a columnar element having a pair of trapezoidal-shaped faces. The magnetic core 3 is structured as follows: the outer core portions 32 are disposed to clamp the inner core portions 31, which are disposed to be away from each other; and the end faces 31e of the inner core portions 31 and the inner end faces 32e of the outer core portions 32 are brought into contact to each other, so as to form an annular shape. When the coil 2 is excited, the inner core portions 31 and the outer core portions 32 form a closed magnetic path.

The inner core portions 31 are each a lamination product in which core pieces 31m made of a magnetic material and gap members 31g representatively made of a non-magnetic material are alternately stacked. The outer core portions 32 are each a core piece made of a magnetic material.

The core pieces may each be a molded product in which magnetic powder is used, or a lamination product formed by a plurality of magnetic thin plates (e.g., electromagnetic steel sheets) provided with insulating coating being stacked. The exemplary molded product may be: a powder magnetic core using powder of iron group metal such as Fe, Co, Ni, Fe-base alloy such as Fe—Si, Fe—Ni, Fe—Al, Fe—Co, Fe—Cr, Fe—Si—Al and the like, rare-earth metal, or a soft magnetic material such as an amorphous magnetic element; a sintered product obtained by press molding the above-noted powder and thereafter sintering the same; and a hardened molded product obtained by subjecting a mixture of the above-noted powder and resin to injection molding, cast molding or the like. In addition, each core piece may be a ferrite core being a sintered product of a metal oxide. Employing the molded product, even a core piece or a magnetic core of a complicated three-dimensional shape can be formed with ease.

As the raw material of the powder magnetic core, what can be suitably used is coated powder made of coated particles in which particles made of the soft magnetic material are provided with an insulating coating on their surface. The powder magnetic core is representatively obtained by molding the coated powder and thereafter subjecting the coated powder to thermal treatment at a temperature equal to or lower than the heat resistant temperature of the insulating coating. Representative insulating coating may be those made of silicone resin or phosphate.

The inner core portions 31 and the outer core portions 32 may be different from each other in material. For example, when the inner core portions 31 are the powder magnetic cores or the lamination products while the outer core portions 32 are the hardened molded products, the saturation magnetic flux density of the inner core portions 31 can be easily increased to be higher than the outer core portions 32. Alternatively, when the inner core portions 31 are the hardened molded products while the outer core portions 32 are the powder magnetic cores or the lamination products, leakage flux can be reduced with ease. Here, the core pieces are powder magnetic cores made of soft magnetic powder containing iron, such as iron or steel.

The gap members 31g are each a plate-like member disposed at the clearance, which is provided between the core pieces for the purpose of adjusting inductance. The constituent material of the gap members 31g is those having permeability lower than that of the core pieces, such as alumina, glass epoxy resin, unsaturated polyester and the like. Representatively, the material of the gap members 31g is a non-magnetic material. Alternatively, for the gap members 31g, use of a mixed material in which magnetic powder (for example, ferrite, Fe, Fe—Si, Sendust and the like) is dispersed in a non-magnetic material such as ceramic or phenolic resin can reduce a leakage flux from each gap portion. It is also possible to employ an air gap.

The number of pieces of the core pieces or the gap member can be selected as appropriate such that the reactor 1 of the desired inductance is obtained. Further, the shape of the core pieces or the gap members can be appropriately selected. Here, though the mode in which each inner core portion 31 is structured by a plurality of core pieces 31m and a plurality of gap members 31g is shown, the gap member may be provided by one in number. Further, depending on the material of the core pieces, the gap members can be dispensed with. Still further, each outer core portion 32 may be made of a single core piece, or may be structured by a plurality of core pieces. In the case where the core pieces are structured by powder magnetic cores, when the inner core portions or the outer core portions are structured by a plurality of core pieces, excellent moldability is exhibited because each core piece can be reduced in size.

In order to integrate the core pieces with one another, or to integrate the core pieces 31m and the gap members 31g with each other, for example, an adhesive agent or an adhesion tape can be used. It is also possible to use an adhesive agent for forming the inner core portions 31, while using no adhesive agent in joining the inner core portions 31 and the outer core portions 32 to each other.

Alternatively, each inner core portion 31 may be integrated using a heat shrink tubing or a cold shrink tubing made of an insulating material. In this case, the insulating tube also functions as an insulating member between the coil element 2a or 2b and the inner core portions 31.

Alternatively, the magnetic core 3 can be annularly integrated through use of a band-like fastening member that can retain the magnetic core 3 annularly. Specifically, by allowing the band-like fastening member to surround the outer circumference of the annularly assembled magnetic core 3 or the outer circumference of the combined product 10, the magnetic core 3 can be retained in an annular manner. The band-like fastening member may be made of a material which is non-magnetic and exhibits excellent heat resistance. For example, commercially available tying members (Ty-Rap (registered trademark of Thomas & Betts International Inc.), PEEK Tie (ties available from Hellermanntyton Co., Ltd.), stainless steel bands (available from Panduit Corp.) and the like) can be used. Allowing a buffer member (for example, those made of resin such as ABS resin, PPS resin, PBT resin, epoxy resin or rubber such as silicone rubber) to be interposed between the magnetic core 3 or the coil 2 and the band-like fastening member, the magnetic core 3 or the coil 2 can be prevented from any damage which may otherwise result from the tightening force of the band-like fastening member.

Furthermore, in connection with the magnetic core 3 shown in this example, the installed-side faces of the inner core portions 31 and the installed-side faces of the outer core portions 32 are not flush with each other. The installed-side faces of the outer core portions 32 project further than the inner core portions 31, while being flush with the installed-side face of the coil 2. Accordingly, the installed-side face of the combined product 10 made up of the coil 2 and the magnetic core 3 is structured by the coil elements 2a and 2b and the outer core portions 32, and both the coil 2 and the magnetic core 3 can be brought into contact with the joining layer 42 (FIG. 2), whose description will be given later. Hence, the reactor 1 possesses an excellent heat dissipating characteristic. Further, since the installed-side face of the combined product 10 is made of both the coil 2 and the magnetic core 3, the contact area relative to the bottom plate portion 40 (FIG. 2) is adequately great. Thus, the reactor 1 is also excellent in stability when being installed. Further, since the core pieces are each made of a powder magnetic core, the portion of the outer core portions 32 projecting further than the inner core portions 31 can be used as the passage of the magnetic flux.

[Insulator]

The reactor 1 shown in this example further includes an insulator 5A interposed between the coil 2 and the magnetic core 3. The insulator 5A will be described with reference to FIGS. 3 and 4. The insulator 5A is integrally structured by a combination of a pair of divided pieces 50a and 50b, which can be divided in the axial direction of the coil 2. The insulator 5A includes sleeve-like portions 51 storing the inner core portions 31, and a pair of frame plate portions 52 interposed between the end faces of the coil elements 2a and 2b and the inner end faces 32e of the outer core portions 32. The sleeve-like portions 51 insulate the coil elements 2a and 2b and the inner core portions 31 from each other, and the frame plate portions 52 insulate the end faces of the coil elements 2a and 2b and the inner end faces 32e of the outer core portions 32 from each other. One of the characteristics of the insulator 5A is provision of a storage portion for the sensor 7.

The divided pieces 50a and 50b have a plurality of rod-like support portions 51a and 51b disposed at the corners of the inner core portions 31 along the axial direction of the inner core portions 31. The support portions 51a and 51b are provided to stand upright from the frame plate portions 52. When the divided pieces 50a and 50b are combined, the support portions 51a and 51b structure the sleeve-like portions 51.

The divided pieces 50a and 50b structuring the insulator 5A have engaging portions that engage with each other. Specifically, the opposite end portions of the support portions 51a and 51b are concave-convex shaped. These concave and convex portions function as the engaging portions that engage with each other as shown in FIG. 4 (A), when the divided pieces 50a and 50b are combined. The engaging portions can be in any shape so long as they are capable of positioning the divided pieces 50a and 50b relative to each other. Here, though each engaging portion has an angulated stepped shape, it may have a curved shape such as a wavy shape, or a zigzag shape. Provision of the engaging portions facilitates positioning of the divided pieces 50a and 50b, and provides excellent assemblability. In this example, since the divided pieces 50a and 50b can be properly positioned, the storage portion for the sensor 7, whose description will be given later, can be formed properly. Thus, the sensor 7 can be disposed at a prescribed position.

Further, in this example, the support portions 51a and 51b are structured such that only part of the inner core portions 31 (mainly the corner portions) is covered by the sleeve-like portions 51 and the other part is exposed. Accordingly, for example, when a sealing resin is included, the contact area between the inner core portions 31 and the sealing resin can be increased. Furthermore, it facilitates bubbles to dissipate when the sealing resin is poured. Thus, excellent manufacturability of the reactor 1 can be exhibited.

Further, in this example, though the length of the support portions 51a and 51b (the length along the axial direction of the inner core portions 31) is adjusted such that the sleeve-like portions 51 are present over the entire length of the inner core portions 31, the length may be reduced. In this case, forming an insulating coat layer made of an insulating material at the outer circumference of the inner core portions 31, insulation between the coil elements 2a and 2b and the inner core portions 31 can be enhanced. The insulating coat layer can be formed by, for example, by an insulating tubing such as the heat shrink tubing, an insulating tape, insulating paper or the like.

Further, in this example, though the divided pieces 50a and 50b each include four support portions 51a and 51b, the number of the support portions 51a and 51b may be three or less for each of the divided pieces 50a and 50b so long as insulation between the inner core portions 31 and the coil elements 2a and 2b can be established (for example, only the two disposed on the polygonal line). Alternatively, the sleeve-like portion may be formed to be sleeve-like by the following manner, for example: integrating members having ]-shaped cross section and being divided in the direction perpendicular to the axial direction of the coil elements 2a and 2b with the frame plate portions, respectively; and thereafter combining the divided pieces.

The frame plate portions 52 are each a B-shaped flat plate portion having a pair of opening portions (through holes) into which the inner core portions 31 can be inserted.

The frame plate portions 52 respectively include partition portions 53a and 53b, in addition to the support portions 51a and 51b. The partition portions 53a and 53b are disposed so as to be interposed between the coil elements 2a and 2b when the divided pieces 50a and 50b are assembled to the coil 2. The partition portions 53a and 53b are provided so as to project from their respective frame plate portions 52 toward the coil. Thanks to the partition portions 53a and 53b, the coil elements 2a and 2b are out of contact from each other, and the coil elements 2a and 2b can be surely insulated from each other. Further, here, when the divided pieces 50a and 50b are combined, an in-contact place and an out-of-contact place are produced at the place where the partition portions 53a and 53b of the divided pieces 50a and 50b oppose to each other, and the space formed at the out-of-contact place is used as the storage portion for the sensor 7.

The partition portion 53a provided at one divided piece 50a is a trapezoidal plate as shown in FIG. 4 (B) and includes: a storage forming portion 54a, which is an end face inclined upward from the center portion in the top-bottom direction (the direction being perpendicular to both the axial direction and the laterally juxtaposed direction of the coil element when the insulator 5A is assembled to the coil 2) in FIG. 4 (B); and a straight end face being continuous to the inclined end face and being parallel to the top-bottom direction (hereinafter referred to as the straight end face).

The partition portion 53b provided at the other divided piece 50b is an L-shaped plate as shown in FIG. 4 (B), and includes: a straight end face that opposes to the straight end face of the one divided piece 50a when the divided pieces 50a and 50b are combined; and a storage forming portion 54b, which is an end face being inclined along the storage forming portion 54a. The storage forming portions 54a and 54b are provided so as to be disposed between the inclined end faces with a prescribed interval between the storage forming portions 54a and 54b, when the divided pieces 50a and 50b are combined. By the storage forming portions 54a and 54b, a diagonal space (the space having an angle corresponding to the angle of the inclined end faces relative to the top-bottom direction=the out-of-contact place) is formed. The space formed by the storage forming portions 54a and 54b is used as the storage portion for the sensor 7 (FIG. 4 (B)).

When the sensor 7 is stored in the storage portion, by the storage forming portion 54b of the other divided piece 50b, the sensor 7 is pressed toward the storage forming portion 54a of the one divided piece 50a. Here, the projecting length of L-shape of the storage forming portion 54b is adjusted such that the sensor 7 can be held at least by half of its length. Further, here, between the coil elements 2a and 2b, the storage forming portions 54a and 54b are structured such that the sensor 7 (the heat sensitive element 7a) is disposed at the central region including the center of the coil 2 in the axial direction (here, the region ranging from the center to the length 30% as great as the length of the coil 2 in the axial direction, that is, the region measuring 60% of the length of the coil 2 in the axial direction including the center).

The size of the partition portions 53a and 53b can be selected as appropriate. In this example, the partition portions 53a and 53b are structured to be disposed to cover substantially the entire region of the coil elements 2a and 2b in the axial direction, and to cover substantially the entire region in the top-bottom direction. However, the partition portions may be formed such that a region without any partition portion is present between the coil elements 2a and 2b. For example, in the partition portions 53a and 53b shown in FIG. 4 (B), the regions lower than the storage forming portions 54a and 54b can be omitted. Likewise, the shape of the partition portions 53a and 53b can be selected as appropriate. By making such changes in the shape of the partition portions, the shape of the storage portion (the storage state of the sensor 7) can be varied in many ways (for example, see seventh and eighth embodiments which will follow).

Further, in this example, the other divided piece 50b is provided with a hook portion 55 on which the line 71 coupled to the sensor 7 is hooked. The hook portion 55 is positioned on the side (the tip side of the sensor 7, the right side in FIG. 4 (B)) opposite to the base side of the sensor 7 to which the line 71 is coupled in the state where the sensor 7 is stored in the inclined storage portion. The line 71 is folded back in a hairpin manner from the base side of the sensor 7 stored in the storage portion. The folded back line 71 can be held by the hook portion 55. Since the line 71 is held in such a folded back state, the sensor 7 will not easily come off from the storage portion even when the line 71 is pulled.

The shape of the hook portion 55 is not particularly limited. Here, it is a band-like piece projecting in the direction perpendicular to the partition portion 53b. The length of the band-like piece along the axial direction of the coil is not particularly limited. When the band-like piece is short, it will not become an obstacle while the sensor 7 is inserted into the storage portion, and hence insertion workability of the sensor 7 is achieved. When the band-like piece is long, the line 71 can more surely be held. Other exemplary hook portion may be as follows. A projection extending from the partition portion 53b upward in the top-bottom direction may be provided, and the projection may be used as the hook portion for the line 71. Allowing the line 71 to wrap around the projection, the line 71 can be fixed. Alternatively, a through hole (for example, a hole along the axial direction of the coil) may be provided at the partition portion 53b, and the through hole may be used as the hook portion for the line 71. Allowing the line 71 to penetrate through the through hole, the line 71 can be restricted from shifting to some degree. Alternatively, the partition portion 53b may be provided with a notch or a plurality of projections with which the line 71 can be clamped, such that the notch or the projections can be used as the hook portion for the line 71. Allowing the line 71 to be clamped by the notch or the projections, the line 71 can be fixed. Alternatively, the through hole, the projections, or the notch may be provided at part of the partition portion 53a or the frame plate portion 52, such that they can be used as the hook portion for the line 71. The position of the hook portion 55 can be selected as appropriate. Further, the insulator may include a plurality of hook portions. In the present invention, since the case 4 includes the hook portion 43a, an insulator with no hook portion may be employed.

Furthermore, the other divided piece 50b also includes a pedestal 52p for placing the coil couple portion 2r and for insulating the coil couple portion 2r and the outer core portions 32 from each other. The pedestal 52p projects, in the frame plate portion 52 of the divided piece 50b, in the direction opposite to the partition portion 53b (the right side in FIG. 4 (B)). That is, the frame plate portion 52 of the divided piece 50b has the partition portion 53b projecting toward one side (the left side in FIG. 4 (B)), and has the pedestal 52p projecting toward the other side.

Furthermore, in this example, in the frame plate portion 52 of each of the divided pieces 50a and 50b, a positioning projection (not shown) that positions the corresponding outer core portion 32 is provided at the face being brought into contact with the outer core portion 32. Therefore, excellent assemblability is achieved. The positioning projection may be dispensed with.

As the constituent material of the insulator 5A, an insulating material such as polyphenylene sulfide (PPS) resin, polytetrafluoroethylene (PTFE) resin, polybutylene terephthalate (PBT) resin, liquid crystal polymer (LCP) and the like can be used. The insulator 5A can be molded with ease through injection molding or the like, even when it is in a complicated shape.

[Case]

A description will be given of the case 4 with reference to FIG. 2. The case 4 includes the flat plate-like bottom plate portion 40 on which the combined product 10 made up of the coil 2 and the magnetic core 3 is placed, and a frame-like side wall portion 41A provided to stand upright from the bottom plate portion 40. One of the characteristics of the case 4 lies in that the bottom plate portion 40 and the side wall portion 41A are not integrally molded, i.e., being independent members, and are integrated by fixation members. Further, the bottom plate portion 40 is provided with a joining layer 42 at its one face (inner face). The joining layer 42 fixes the coil 2 to the bottom plate portion 40. Then, the reactor 1 is best characterized by the following features: the side wall portion 41A is molded by an insulating resin; and the hook portion 43a for the line 71 (FIG. 1) of the sensor 7 (FIG. 1) is integrally molded with the side wall portion 41A.

(Bottom Plate Portion)

The bottom plate portion 40 is a quadrangular plate, and is fixed to an installation target so as to be brought into contact therewith when the reactor 1 is installed in the installation target. Though the example in FIG. 2 shows the installation state where the bottom plate portion 40 is on the bottom side, in another possible installation state, the bottom plate portion 40 may be oriented upward or sideways. The outer shape of the bottom plate portion 40 can be selected as appropriate. Here, the bottom plate portion 40 has attaching portions 400 respectively projecting from the four corners. The side wall portion 41A, whose description will be given later, also has attaching portions 411. When the bottom plate portion 40 and the side wall portion 41A are combined to form the case 4, the attaching portions 400 overlap with the attaching portions 411 of the side wall portion 41A. The attaching portions 400 and 411 are respectively provided with bolt holes 400h and 411h into which bolts (not shown) for fixing the case 4 to the installation target are inserted. The bolt holes 400h are provided so as to be continuous to the bolt holes 411h of the side wall portion 41A, whose description will be given later. The bolt holes 400h and 411h may each be a through hole not being threaded or may be a screw hole being threaded. The number of pieces or the like of the bolt holes 400h and 411h can be arbitrarily selected.

Alternatively, the side wall portion 41A may not be provided with the attaching portions, and solely the bottom plate portion 40 may be provided with the attaching portions 400. In this case, the outer shape of the bottom plate portion 40 is formed such that the attaching portions 400 of the bottom plate portion 40 project from the outer shape of the side wall portion. Alternatively, solely the side wall portion 41A may have the attaching portions 411, and the bottom plate portion 40 may have no attaching portions. In this case, the outer shape of the side wall portion 41A is formed such that the attaching portions 411 of the side wall portion 41A project from the outer shape of the bottom plate portion 40.

It is preferable that the bottom plate portion 40 is made of an electrically conductive material such as a metal material. Since metal materials are generally high in thermal conductivity, the bottom plate portion 40 possessing an excellent heat dissipating characteristic can be obtained. Further, since the bottom plate portion 40 on which the coil 2 is disposed possesses an excellent heat dissipating characteristic, the heat of the coil 2 can be efficiently transferred to the installation target via the joining layer 42 and the bottom plate portion 40. Accordingly, a reactor possessing an excellent heat dissipating characteristic can be obtained. In particular, since the bottom plate portion 40 is disposed near the coil 2, it is preferable that the metal material is a non-magnetic metal.

Specific metal may include, for example, aluminum (thermal conductivity: 237 W/m·K) and aluminum alloy, magnesium (156 W/m·K) and magnesium alloy, copper (398 W/m·K) and copper alloy, silver (427 W/m·K) and silver alloy, iron (80 W/m·K), austenitic stainless steel (for example, SUS304: 16.7 W/m·K) and the like. Using such aluminum, magnesium, and alloy thereof, a lightweight case can be obtained. Thus, it becomes possible to contribute toward reducing the weight of the reactor. In particular, since aluminum and aluminum alloy exhibit excellent corrosion resistance, and magnesium and magnesium alloy excellently withstand vibrations, such materials can be suitably used for in-vehicle components. When the bottom plate portion 40 is to be formed by any metal material, it can be achieved by casting such as die casting, press working (representatively, punching) or the like.

When the bottom plate portion 40 is to be formed by an electrically conductive material, by performing anodizing such as alumite treatment such that very thin insulating coating (having a thickness of approximately 1 μm to 10 μm) on the surface of the bottom plate portion 40, insulation between the bottom plate portion 40 and the coil 2 can be enhanced.

(Side Wall Portion)

The side wall portion 41A is a quadrangular frame-like element. The side wall portion 41A is disposed to surround the combined product 10 when the case 4 is assembled while having its one opening portion closed by the bottom plate portion 40 and its other opening portion being opened. Here, in connection with the side wall portion 41A, the outer shape of the region becoming the installation side (the region on the bottom plate portion 40 side) when the reactor 1 is installed at the installation target is quadrangular conforming to the outer shape of the bottom plate portion 40, and the region on the open side is in a curved plane shape conforming to the outer circumference face of the combined product 10 made up of the coil 2 and the magnetic core 3.

Figure 2:
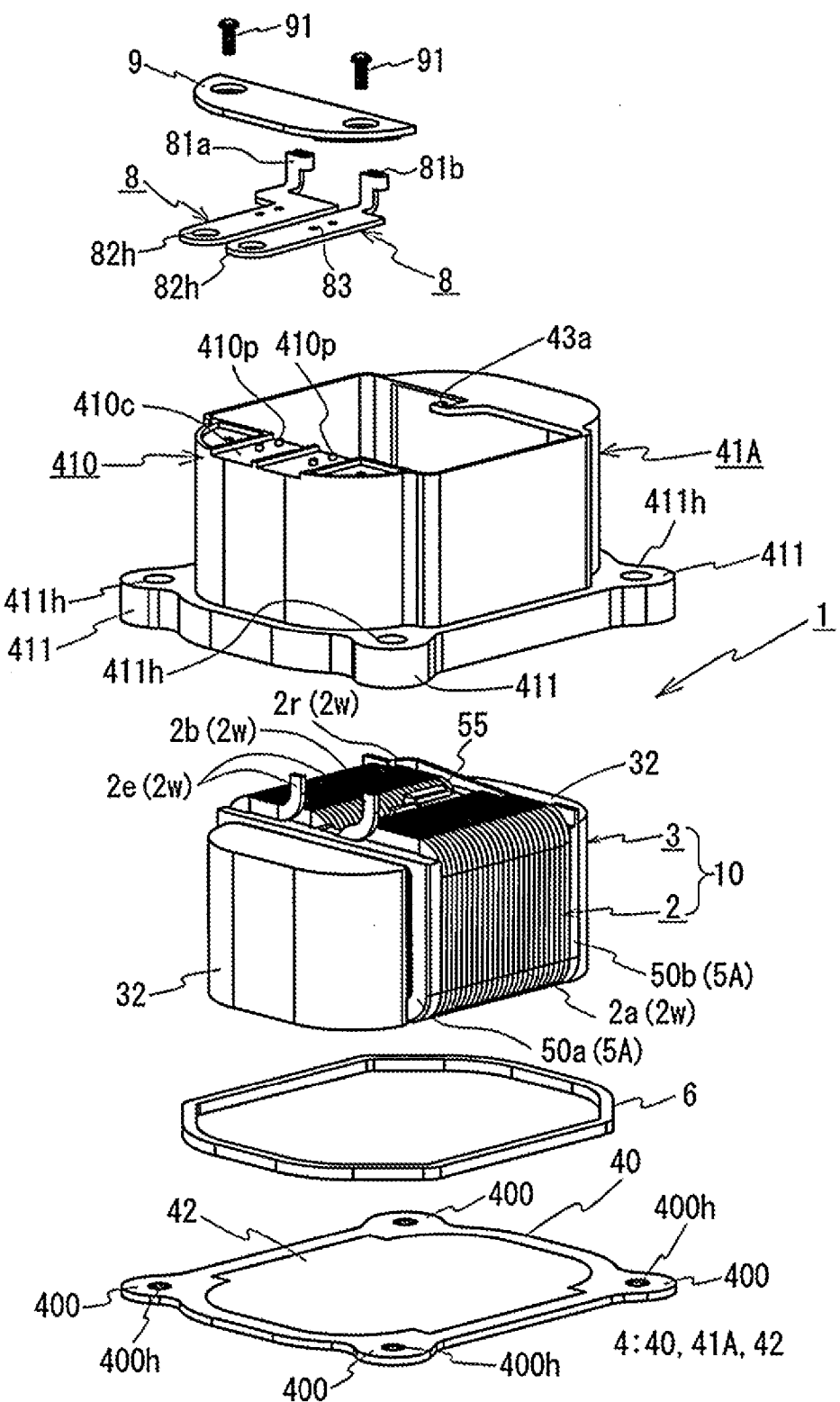
FIG. 2 is an exploded perspective view showing an overview of the reactor according to the first embodiment.
Figure 3:
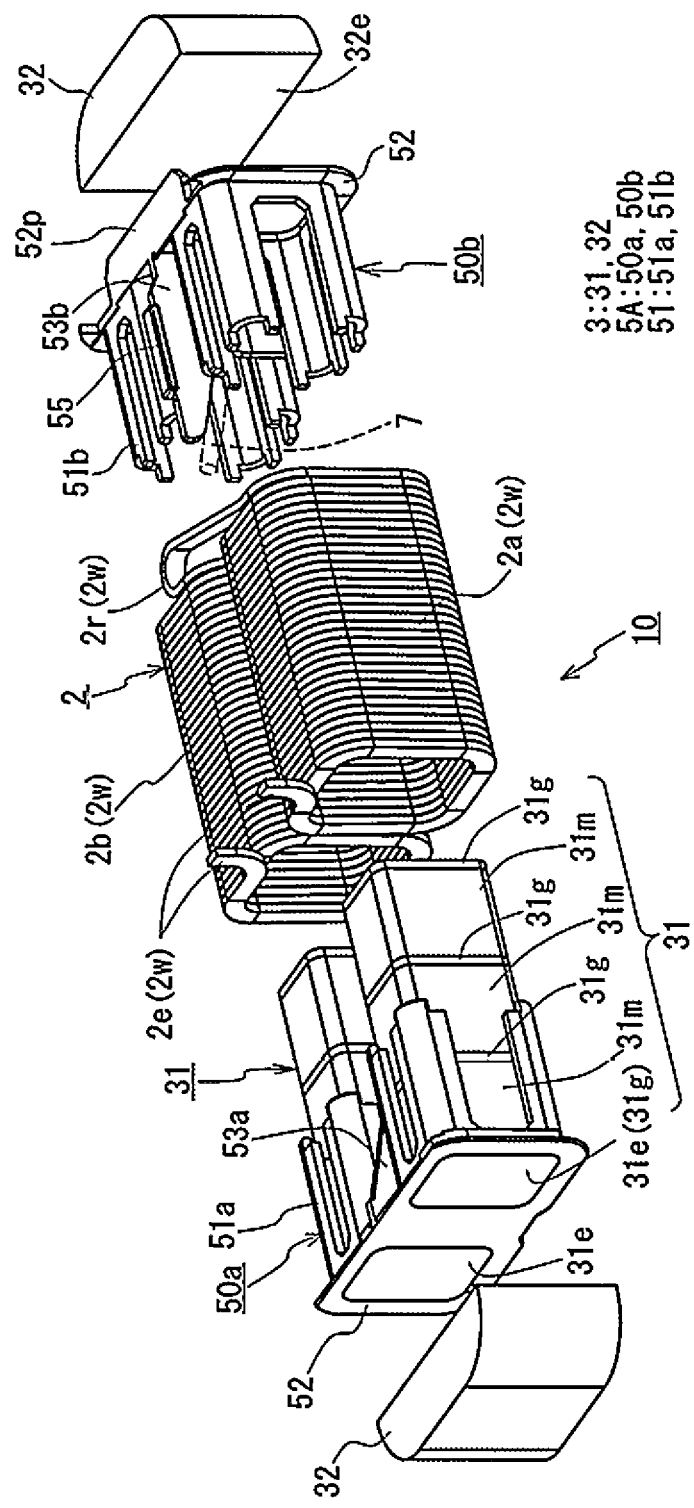
FIG. 3 is an exploded perspective view showing an overview of a combined product made up of a coil and a magnetic core included in the reactor according to the first embodiment.

Further, here, at the region on the opening side of the side wall portion 41A, a terminal block 410 is provided so as to cover the trapezoidal-shaped face of one outer core portion 32 (the one on the near side in FIG. 2) of the combined product 10, and an overhanging portion is provided so as to cover the trapezoidal-shaped face of the other outer core portion 32 (the one on the depth side in FIG. 2). Accordingly, as shown in FIG. 1, in connection with the combined product 10 stored in the case 4, the coil 2 is exposed while the magnetic core 3 is substantially covered by the material structuring the case 4. Provision of the terminal block 410 and the overhanging portion provides various effects such as: (1) an improvement in vibration resistance; (2) an improvement in rigidity of the case 4 (the side wall portion 41A); (3) protection from the external environment and mechanical protection for the magnetic core 3 (the outer core portions 32); and (4) prevention of the combined product 10 from coming off. The terminal block 410 and the overhanging portion can be dispensed with, to expose both the coil 2 and the trapezoidal-shaped face of one of or both of the outer core portions 32.

Further, the side wall portion 41A is made of resin, in particular, an insulating resin. Specific resin may be polybutylene terephthalate (PBT) resin, urethane resin, polyphenylene sulfide (PPS) resin, acrylonitrile butadiene styrene (ABS) resin and the like. Since the side wall portion 41A is made of an insulating resin, insulation between the coil 2 and the case 4 can be enhanced. Therefore, in the state where the case 4 is assembled, the outer circumference face of the coil 2 and the inner circumference face of the side wall portion 41A can be disposed in close proximity to each other. Here, the interval between the outer circumference face of the coil 2 and the inner circumference face of the side wall portion 41A is approximately 0 mm to 1.0 mm, i.e., very narrow. Further, since the side wall portion 41A is made of resin, even a complicated three-dimensional shape, such as those with the hook portion 43a, can be molded with ease through injection molding or the like. In particular, in this example, since the entire side wall portion 41A is made of resin, formation is easier as compared to the case where the side wall portion 41A is partially made of different materials. Further, since the side wall portion 41A is made of resin, the reactor 1 can be lightweight. When a filler made of ceramic, whose description will be given later, is mixed into the resin, the heat dissipating characteristic of the side wall portion 41A can be enhanced, and a case with an excellent heat dissipating characteristic can be obtained.

Here, the bottom plate portion 40 is made of aluminum alloy, and the side wall portion 41A is made of PBT resin. Thus, the thermal conductivity of the bottom plate portion 40 is fully higher than that of the side wall portion 41A.

[Hook Portion]

The side wall portion 41A includes the hook portion 43a on which the line 71 (FIG. 1) coupled to the sensor 7 (FIG. 1) is hooked, at the center portion of the edge portion of the overhanging portion covering the one outer core portion 32 (the one on the depth side in FIG. 2).

Figure 5:
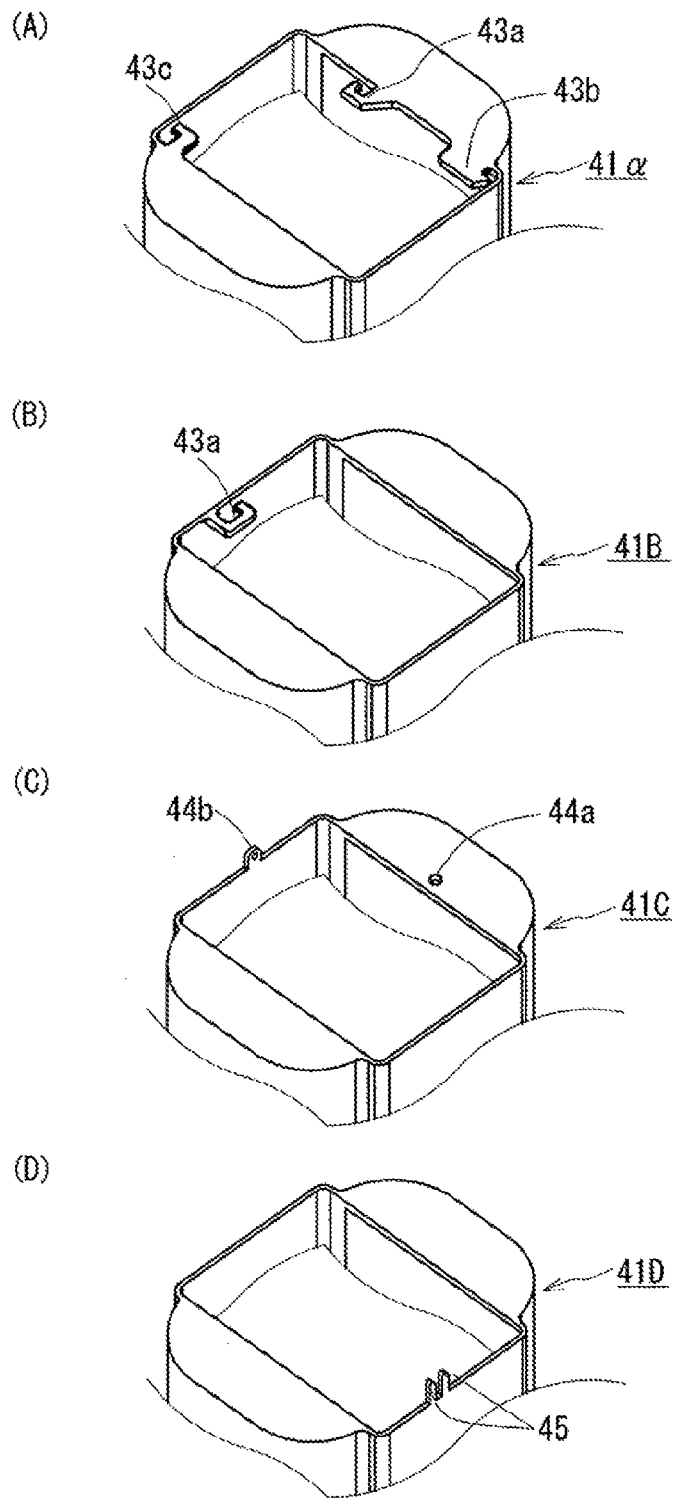
FIG. 5 is a perspective view showing other mode of a side wall portion included in a case, in which the area near an opening portion where a hook portion is provided is shown.
Figure 6:
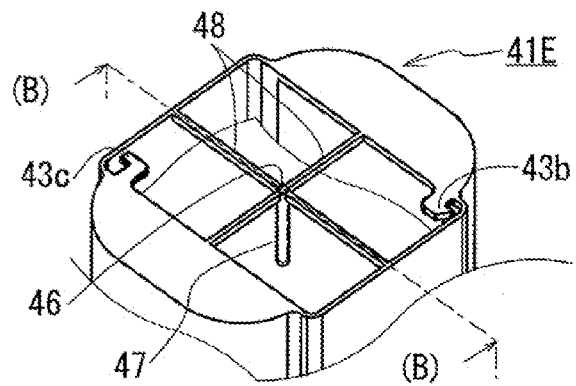
FIG. 6 shows another mode of the side wall portion included in the case, in which (A) is a perspective view of the area near the opening portion where the hook portion is provided and (B) is a cross-sectional view taken along B-B in (A), in which the area near a storage portion storing a sensor is shown.
Figure 6:
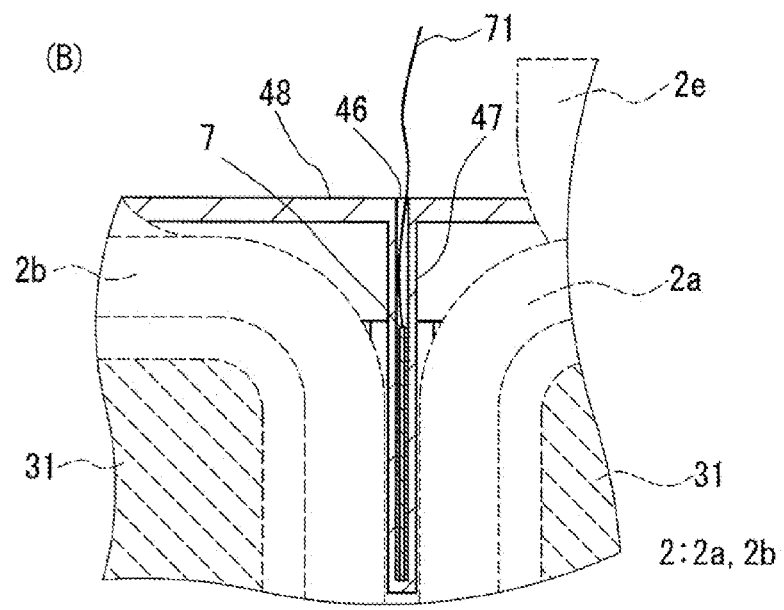

Here, though the hook portion 43a is a C-shaped piece, as shown in the FIGS. 5 and 6 which will be described later, the hook portion may assume various shapes. Likewise, as shown in FIGS. 5 and 6, the hook portion can be disposed at various positions. Since the hook portion 43a is provided to project into the upper space of the coil 2 from the periphery forming the opening portion of the case 4, the line 71 will not easily project outside the case 4. Hence, the reactor 1 can be reduced in size. A single hook portion or a plurality of hook portions of a desired shape can be provided (see FIG. 5 (A)). By integrally molding the hook portion with the side wall portion 41A through injection molding or the like, the hook portion of the desired number of pieces, even in a complicated shape, can be molded at any position in the side wall portion simultaneously with molding of the side wall portion 41A. The hooking method of the line 71 will be described later.

[Attaching Places]

The region on the installation side of the side wall portion 41A is provided with the attaching portions 411 respectively projecting from the four corners, similarly to the bottom plate portion 40. The attaching portions 411 are each provided with the bolt hole 411h, to structure attaching places. The bolt hole 411h may be formed solely by the constituent material of the side wall portion 41A, or may be formed by disposing a tubular element made of a different material. For example, employing a metal pipe made of metal such as brass, steel, or stainless steel as the tubular element, excellent strength is exhibited, and hence creep deformation can be suppressed as compared to the case where the bottom plate portion 40 is solely made of resin. Here, a metal pipe is disposed to form each bolt hole 411h.

[Terminal Fittings]

At the region on the opening side of the side wall portion 41A, to the terminal block 410 provided at the place covering above the other outer core portion 32 (the one on the near side in FIG. 2), a pair of terminal fittings 8 to which the ends 2e of the wire 2w are connected is fixed.

The terminal fittings 8 are each an L-shaped electrically conductive member, made of a plate member made of an electrically conductive material such as copper, copper alloy, aluminum, aluminum alloy being bent as appropriate. At the one end sides of the terminal fittings 8, joining portions 81a and 81b to which the ends 2e of the wire are joined through soldering or welding are provided. At the other end side of each terminal fitting 8, a through hole 82h into which a coupling member such as a bolt for connecting an external apparatus such as a power supply is fitted is provided. The center portion is fixed to the side wall portion 41A.

Here, the joining portions 81a and 81b are each U-shaped. Allowing the end 2e of the wire to be interposed in the U-shape space formed by the joining portion 81a or 81b and, for example, allowing solder to be poured so as to fill the space between the end 2e of the wire and the joining portion 81a or 81b, the coil 2 and the terminal fittings 8 can be electrically connected to each other. Alternatively, the electrical connection can be established also by welding such as TIG welding, fixation under pressure, soldering or the like, after the end 2e of the wire being interposed in the U-shape space is caulked such that the joining portion 81a or 81b and the end 2e of the wire are surely brought into contact with each other.

The shape of the terminal fittings 8 shown in FIG. 2 is of an exemplary nature, and can be changed as appropriate so long as at least the joining portion, the connection place relative to the external apparatus, and the fixing place relative to the side wall portion 41A are included. For example, each joining portion may be flat plate-like.

[Terminal Block]

As shown in FIG. 2, at the terminal block 410, concave grooves 410c where the center portions of the terminal fittings 8 are respectively disposed are formed. The concave grooves 410c are provided with positioning projections 410p for positioning the terminal fittings 8. The terminal fittings 8 are provided with positioning holes 83 into which the projections 410p are fitted. The shape, number of pieces and disposition position of the positioning projections 410p and those of the positioning holes 83 are not particularly limited, so long as the terminal fittings 8 can be positioned. The positioning projections 410p and the positioning holes 83 may not be included. Alternatively, the terminal fittings may be provided with such projections and the terminal block may be provided with such holes.

The terminal fittings 8 fitted into the concave grooves 410c have their top side covered by the terminal fixing member 9. By the terminal fixing member 9 being tightened by bolts 91, the terminal fittings are fixed to the terminal block 410. As the constituent material of the terminal fixing member 9, an insulating resin being similar to the material of the side wall portion 41A can be suitably used. Alternatively, a molded product in which the center portions of the terminal fittings 8 are previously covered by the insulating resin may be formed, and the molded product may be fixed to the side wall portion 41A.

Note that, since the side wall portion 41A is formed by an insulating resin, in place of use of the terminal fixing member 9 and the bolts 91, the side wall portion, the terminal fittings 8, and the terminal block can be integrated by forming the terminal fittings 8 through insert molding. In this mode, fewer numbers of components and assembly steps are required, and hence excellent productivity of the reactor is exhibited.

(Coupling Method)

In order to integrally connect the bottom plate portion 40 and the side wall portion 41A to each other, various fixation members can be used. Exemplary fixation members may be tightening members such as an adhesive agent, bolts and the like. Here, bolt holes (not shown) are provided to the bottom plate portion 40 and the side wall portion 41A, and bolts (not shown) are employed as the fixation members. Allowing the bolts to be screwed in, the bottom plate portion 40 and the side wall portion 41A are integrated.

(Joining Layer)

The bottom plate portion 40 includes the joining layer 42 at the place where at least the installed-side face of the coil 2 is brought into contact, at one face disposed on the inner side when the case 4 is assembled.

When the joining layer 42 is formed as a single-layer structure made of an insulating material, formation is facilitated. Furthermore, even with a metal-made bottom plate portion 40, the coil 2 and the bottom plate portion 40 can be insulated from each other. With the joining layer 42 of a multilayer structure made of an insulating material, insulation can be further enhanced. Employing a joining layer of a multilayer structure of an identical material, the thickness per layer can be reduced. By reducing the thickness, even when pinholes exist, insulation can be secured by the adjacent separate layer blocking the pinholes. On the other hand, employing a joining layer of a multilayer structure made of different materials, a plurality of characteristics such as insulation and adhesion between the coil 2 and the bottom plate portion 40, the heat dissipating characteristic from the coil 2 to the bottom plate portion 40 and the like can be obtained. In this case, the constituent material of at least one layer is an insulating material.

The joining layer 42 tends to exhibit higher insulation performance when its total thickness is greater, and to exhibit better heat dissipating performance when its total thickness is smaller. Furthermore, with the smaller total thickness, the interval between the coil 2 and the bottom plate portion 40 is small. Therefore, a small-sized reactor can be obtained. Though it depends on the constituent material, for example, the joining layer 42 may have a total thickness of less than 2 mm; furthermore 1 mm or less; and particularly, 0.5 mm or less. Alternatively, as will be described later, when the joining layer 42 is made of a material exhibiting excellent thermal conductivity, for example, an excellent heat dissipating characteristic can be exhibited even with a total thickness of 1 mm or more. When the joining layer 42 is made of a material of low thermal conductivity (for example, less than 1 W/m·K), an excellent heat dissipating characteristic is exhibited by reducing the total thickness as described above (preferably, 0.5 mm or less). Note that the thickness of the joining layer 42 as used herein refers to the thickness immediately after formation. In some cases, the thickness of the joining layer 42 is reduced after the combined product 10 is placed (for example, approximately 0.1 mm).

The shape of the joining layer 42 is not particularly limited so long as it has an area wide enough at least for the installed-side face of the coil 2 to be fully brought into contact. Here, as shown in FIG. 2, the joining layer 42 conforms to the shape of the installed-side face of the combined product 10, that is, the shape formed by the installed-side face of the coil 2 and that of the outer core portions 32. Accordingly, both the coil 2 and the outer core portions 32 can be fully brought into contact with the joining layer 42.

In particular, when the joining layer 42 has a multilayer structure including an adhesive layer made of an insulating material on the front face side with which the installed-side face of the coil 2 is brought into contact, and a heat dissipation layer exhibiting excellent thermal conductivity on the side with which the bottom plate portion 40 is brought into contact, an excellent heat dissipating characteristic is exhibited. Here, the joining layer 42 has a multilayer structure including an adhesive layer and a heat dissipation layer.

Any material exhibiting excellent adhesion strength can be suitably used for the adhesive layer. For example, the adhesive layer may be made of an insulation adhesive agent, specifically, an epoxy base adhesive agent, an acryl base adhesive agent and the like. The adhesive layer may be formed by, for example, application on the heat dissipation layer, or through screen printing. A sheet-like adhesive agent may be used for the adhesive layer. With the sheet-like adhesive agent, the adhesive layer or the joining layer of the desired shape can be formed with ease irrespective of the single-layer structure or the stacked-layer structure. Here, the adhesive layer has a single-layer structure made of an insulation adhesive agent.

For the heat dissipation layer, a material possessing an excellent heat dissipating characteristic, preferably a material whose thermal conductivity is higher than 2 W/m·K can be suitably used. For the heat dissipation layer, higher thermal conductivity is preferable. It is preferable to be made of a material whose thermal conductivity is 3 W/m·K or more; particularly 10 W/m·K or more; furthermore 20 W/m·K or more; and especially 30 W/m·K or more.

The specific constituent material of the heat dissipation layer may include, for example, a metal material. Though metal materials generally exhibit high thermal conductivity, they are electrically conductive materials. Therefore, it is desired to enhance the insulation performance of the adhesive layer. Further, the heat dissipation layer made of a metal material tends to be heavy. On the other hand, use of a non-metallic inorganic material such as ceramic, being one type of material selected from oxide, carbide, and nitride of metallic element, B, and Si as the constituent material of the heat dissipation layer provides an excellent heat dissipating characteristic and also an excellent electrical insulating characteristic. Therefore, it is preferable. More specific ceramic may be: silicon nitride ($Si_3N_4$) by approx. 20 W/m·K to 150 W/m·K; alumina ($Al_2O_3$) by approx. 20 W/m·K to 30 W/m·K; aluminum nitride (AlN) by approx. 200 W/m·K to 250 W/m·K; boron nitride (BN) by approx. 50 W/m·K to 65 W/m·K; silicon carbide (SiC) by approx. 50 W/m·K to 130 W/m·K. In order to form the heat dissipation layer by those types of ceramic, for example, deposition such as PVD or CVD can be used. Alternatively, the heat dissipation layer can be formed by preparing a sintered plate of the ceramic, and joining the same to the bottom plate portion 40 by any appropriate adhesive agent.

Alternatively, the constituent material of the heat dissipation layer may be an insulating resin (for example, epoxy resin, acrylic resin) containing a filler made of the ceramic noted above. This material provides a heat dissipation layer possessing both an excellent heat dissipating characteristic and an excellent electrical insulating characteristic. Further, in this manner, since both the heat dissipation layer and the adhesive layer are formed by an insulating material, that is, since the entire joining layer is made of an insulating material, the joining layer exhibits further excellent insulating performance. When the insulating resin is made of an adhesive agent, adhesion between the heat dissipation layer and the adhesive layer is excellent, and the joining layer including the heat dissipation layer can strongly join the coil 2 and the bottom plate portion 40 to each other. The adhesive agent forming the adhesive layer and the adhesive agent forming the heat dissipation layer may be of different types. However, when they are of the same type, excellent adhesion can be achieved, and furthermore, formation of the joining layer is facilitated. It is also possible to form the entire joining layer by an insulation adhesive agent containing the filler. In this case, the joining layer has a multilayer structure made of a single type of material.

The heat dissipation layer made of resin containing the filler can be formed with ease by, for example, applying the material to the bottom plate portion 40 or through screen printing.

Alternatively, the heat dissipation layer may be formed by joining a sheet member possessing an excellent heat dissipating characteristic to the bottom plate portion 40 by any appropriate adhesive agent.

The heat dissipation layer may have a single-layer structure or a multilayer structure. When the multilayer structure is employed, the material of at least one layer may be differed. For example, the heat dissipation layer may have a multilayer structure made of materials differing in thermal conductivity from each other.

When the heat dissipation layer is included, since the heat dissipation layer can secure the heat dissipating characteristic, flexibility in selecting usable sealing resin is increased, if a sealing resin is to be in included. For example, resin with poor thermal conductivity such as resin with no filler can be used as the sealing resin.

Here, the heat dissipation layer is formed by an epoxy base adhesive agent (whose thermal conductivity is 3 W/m·K or more) containing a filler made of alumina. Accordingly, here, the entire joining layer is made of an insulation adhesive agent. Further, here, the heat dissipation layer is formed to have a two-layer structure made of the adhesive agent containing the filler, in which the thickness per layer is 0.2 mm, i.e., 0.4 mm in total (the total thickness with the adhesive layer being 0.5 mm). The heat dissipation layer may be made of three or more layers.

[Other Members Stored in Case]

Alternatively, employing the structure in which the back face of one outer core portion 32 is brought into contact with the side wall portion 41A of the case 4, and a member (for example, a leaf spring) that presses the other outer core portion 32 toward the one outer core portion 32 is inserted between the back face of the other outer core portion 32 and the side wall portion 41A, it becomes possible to prevent the gap length from being changed by any external factor such as vibrations or a shock. In such a structure in which the pressing member is used, when the gap members 31g are each an elastic gap member formed by an elastic material such as silicone rubber, fluororubber and the like, deformation of the gap members 31g can adjust the gap length or absorb a certain amount of dimension error.

Further, other than the temperature sensor, a plurality of types of physical quantity measuring sensors, such as a current sensor, can be stored in the case 4. In the case where a plurality of sensors are included, a plurality of hook portions may be provided at the side wall portion, or a plurality of lines may share one hook portion.

[Sealing Resin]

The case 4 may be packed with a sealing resin (not shown) being an insulating resin. In this case, the ends 2e of the wire are exposed outside the sealing resin, such that the ends 2e of the wire and the terminal fittings 8 can be joined to each other through welding or soldering. Alternatively, the sealing resin may be packed after the welding or the like such that the ends 2e of the wire and the terminal fittings 8 are buried. The packing amount of the sealing resin can be selected as appropriate. The entire surface of top face of the coil 2 may be buried by the sealing resin. Alternatively, the top face may be exposed outside the sealing resin.

The exemplary sealing resin may include epoxy resin, urethane resin, silicone resin and the like. Further, employing a sealing resin containing a filler being excellent in insulating performance and thermal conductivity, for example a filler made of at least one type of ceramic selected from silicon nitride, alumina, aluminum nitride, boron nitride, mullite, and silicon carbide, the heat dissipating characteristic can further be enhanced.

When the case 4 is to be packed with a sealing resin, a gasket 6 may be provided in order to prevent uncured resin from leaking from the clearance between the bottom plate portion 40 and the side wall portion 41A. Here, the gasket 6 is an annular element of the dimension with which the gasket 6 can be fitted to the outer circumference of the combined product 10 made up of the coil 2 and the magnetic core 3. Though the gasket 6 made of synthetic rubber is employed, any appropriate material can be used. On the installation side of the side wall portion 41A of the case 4, a gasket groove (not shown) in which the gasket 6 is disposed is provided. When the bottom plate portion 40 and the side wall portion 41A are to be integrated by an adhesive agent, since the bottom plate portion 40 and the side wall portion 41A can be closely bonded to each other by the adhesive agent, leakage of the sealing resin can be prevented. Accordingly, the gasket 6 can be dispensed with.

<<Manufacture of Reactor>>

The reactor 1 structured as described above can be representatively manufactured by the following procedure: preparation of the combined product, preparation of the side wall portion, and preparation of the bottom plate portion ⇒ fixation of the coil ⇒ disposition of the side wall portion ⇒ assembly of the case ⇒ joining of the terminal fittings and the wire ⇒ disposition of the sensor and hooking of the line ⇒ packing of the sealing resin.

[Preparation of Combined Product]

Firstly, a description will be given of the preparation procedure of the combined product 10 made up of the coil 2 and the magnetic core 3. Specifically, as shown in FIG. 3, the inner core portions 31 each made up of the stacked core pieces 31*m* and gap members 31*g*, and the one divided piece 50*a* of the insulator 5A are inserted into the coil elements 2*a* and 2*b*. Here, the outer circumference face of the lamination product made up of the core pieces 31*m* and the gap member 31*g* is continuously joined by the adhesion tape, to form each columnar inner core portion 31. Next, to the other ends of the coil elements 2*a* and 2*b*, the other divided piece 50*b* of the insulator 5A is inserted. At this time, the support portions 51*b* of the divided piece 50*b* can be used as the guide. Note that, it is also possible not to integrate the core pieces 31*m* and the gap members 31*g* by an adhesion tape, an adhesive agent or the like, and leave them in the state being separated from one another. In this case, part of the core pieces 31*m* and gap members 31*g* should be supported by the one divided piece 50*a*, and the other core pieces 31*m* and the gap members 31*g* should be supported by the other divided piece 50*b*, to be inserted into the coil elements 2*a* and 2*b*. By allowing the concave and convex of the support portions 51*a* and 51*b* of the divided pieces 50*a* and 50*b* to be engaged with each other, the divided pieces 50*a* and 50*b* are positioned relative to each other.

Next, the outer core portions 32 are disposed so as to clamp the frame plate portions 52 of the insulator 5A, to thereby form the combined product 10. At this time, the end faces 31*e* of the inner core portions 31 are exposed by the opening portions of the frame plate portions 52, to be brought into contact with the inner end faces 32*e* of the outer core portions 32. Between the coil elements 2*a* and 2*b*, the partition portions 53*a* and 53*b* of the insulator 5A are interposed. Further, by the storage forming portions 54*a* and 54*b* of the partition portions 53*a* and 53*b*, the space serving as the storage portion of the sensor 7 is formed.

[Preparation of Side Wall Portion]

As shown in FIG. 2, in the concave grooves 410*c* of the side wall portion 41A formed into a prescribed shape through injection molding or the like, the terminal fittings 8 and the terminal fixing member 9 are disposed in order. Then, the bolts 91 are tightened, to prepare the side wall portion 41A to which the terminal fittings 8 are fixed. It is also possible to prepare the terminal fittings 8 being integrally molded with the side wall portion, as has been described above.

[Preparation of Bottom Plate Portion, Fixation of Coil]

As shown in FIG. 2, an aluminum alloy plate is punched into a prescribed shape, to form the bottom plate portion 40. The joining layer 42 of a prescribed shape is formed on one face of the bottom plate portion 40 through screen printing. Thus, the bottom plate portion 40 provided with the joining layer 42 is prepared. Then, the assembled combined product 10 is placed on the joining layer 42. Thereafter, the joining layer 42 is cured as appropriate, to thereby fix the combined product 10 to the bottom plate portion 40.

The joining layer 42 allows the coil 2 to be closely bonded to the bottom plate portion 40, and fixes the position of the coil 2 and the outer core portions 32 relative to each other. Hence, the position of the inner core portions 31 clamped between the pair of outer core portions 32 is also fixed. Accordingly, even if the inner core portions 31 and the outer core portions 32 are not joined to each other by an adhesive agent, or the core pieces 31*m* and the gap members 31*g* are not joined to one another by an adhesive agent or an adhesion tape so as to be integrated, the joining layer 42 makes it possible to annularly integrate the magnetic core 3 including the inner core portions 31 and the outer core portions 32. Further, since the joining layer 42 is made of an adhesive agent, the combined product 10 is strongly fixed to the joining layer 42.

Though the joining layer 42 may be formed immediately before disposition of the combined product 10, it is also possible to use the bottom plate portion 40 to which the joining layer 42 is previously formed. In the latter case, a release paper should be previously disposed in order to prevent attachment of foreign objects to the joining layer 42, until the combined product 10 is disposed. It is also possible to previously form solely the heat dissipation layer, and solely the adhesive layer may be formed immediately before the combined product 10 is disposed.

[Disposition of Side Wall Portion]

The side wall portion 41A provided with the terminal fittings 8 is placed from above the combined product 10 so as to surround the outer circumference face of the combined product 10, and disposed on the bottom plate portion 40. At this time, the side wall portion 41A is disposed such that the ends 2*e* of the wire are respectively interposed in the U-shape joining portions 81*a* and 81*b*. Thus, the joining portions 81*a* and 81*b* of the terminal fittings 8 can be used as the guide. As described above, when the side wall portion 41A is placed from above the combined product 10, the terminal block 410 and the overhanging portion of the side wall portion 41A respectively cover the trapezoidal-shaped faces, which are disposed on the top side of the outer core portions 32 of the combined product 10. The terminal block 410 and the overhanging portion serve as the stopper by covering the outer core portions 32. That is, the terminal block 410 and the overhanging portion function to position the side wall portion 41A relative to the combined product 10. The side wall portion 41A may be previously disposed around the combined product 10, and then the terminal fittings 8 may be fixed to the side wall portion 41A.

[Assembly of Case]

Here, the bottom plate portion 40 and the side wall portion 41A are integrated with each other through use of separately prepared bolts (not shown). Through this step, the box-like case 4 as shown in FIG. 1 is assembled, and the state where the combined product 10 is stored in the case 4 can be achieved. Further, the state where the ends 2e of the wire are respectively interposed in the joining portions 81a and 81b of the terminal fittings 8 can be achieved. Still further, the state where the hook portion 43a provided at the side wall portion 41A and the hook portion 55 of the insulator 5A are disposed between and above the coil elements 2a and 2b can be achieved. From the foregoing procedure, the reactor 1 with no sensor 7 is formed.

[Joining of Terminal Fitting and Wire]

The ends 2e of the wire and the joining portions 81a and 81b of the terminal fittings 8 are joined through welding, soldering, fixation under pressure or the like, to thereby electrically connect the ends 2e of the wire and the terminal fittings 8 to each other. Note that joining of the terminal fittings 8 and the wire 2w may precede disposition of the sensor 7 and hooking of the line, and vice versa.

[Disposition of Sensor and Hooking of Line]

The sensor 7 is inserted to be disposed in the space (storage portion) formed by the storage forming portions 54a and 54b (FIG. 4) of the divided pieces 50a and 50b of the insulator 5A. At this time, as shown in FIG. 4 (B), the sensor 7 is inserted while using the end face of the partition portion 53b of the other divided piece 50b of the insulator 5A as the stopper. As has been described above, the sensor 7 inserted into the storage portion is disposed so as to be inclined relative to the direction being perpendicular to both the laterally juxtaposed direction of the coil elements 2a and 2b and the axial direction thereof (the top-bottom direction in FIG. 4), and in accordance with the inclination of the storage forming portions 54a and 54b of the partition portions 53a and 53b.

Then, the line 71 coupled to the sensor 7 is hooked on the hook portion 55 of the insulator 5A and the hook portion 43a of the side wall portion 41A of the case 4. Here, as shown in FIG. 1, the line 71 is folded back from the insertion direction (the direction toward diagonally right below in FIG. 1) of the sensor 7. Then the line 71 is routed as follows: beneath the hook portion 55 ⇒ from beneath the hook portion 43a to above the hook portion 43a, to be hooked thereon. In this manner, by allowing the line 71 to be hooked on a plurality of hook portions 55 and 43a, the line 71 can be more surely fixed. Further, employing the structure in which the line 71 is folded back from the insertion direction of the sensor 7 and routed to be hooked as described above, even when the line 71 is pulled in the direction in which the sensor 7 comes off, the partition portion 53b of the other divided piece 50b of the insulator 5A serves as the stopper and prevents the sensor 7 from coming off from the storage portion. From the foregoing procedure, the reactor 1 with no sealing resin is formed. Note that, the sensor 7 can be disposed at the prescribed position after the line 71 is hooked. However, when disposition of the sensor 7 precedes, the redundant length will not easily be generated in the line 71, and the sensor 7 will not easily come off from the storage portion.

[Packing of Sealing Resin]

By allowing the case 4 to be packed with a sealing resin (not shown) and to be cured, the reactor 1 having a sealing resin can be formed. In this mode, both the sensor 7 and the line 71 can be fixed with a sealing resin. At this time, since the line 71 is hooked on the hook portions 55 and 43a as described above, the line 71 will not become an obstacle when the resin is packed. Note that, in this mode, joining of the joining portions 81a and 81b with the ends 2e of the wire may be performed after the sealing resin is packed.

<<Application>>

The reactor 1 structured as described above can be suitably used for applications in which the energizing conditions are, for example: the maximum current (direct current) is approx. 100 A to 1000 A; the average voltage is approx. 100 V to 1000 V; and the working frequency is approx. 5 kHz to 100 kHz. Representatively, the reactor 1 can be suitably used for a constituent component of an in-vehicle power converter apparatus for an electric vehicle, a hybrid vehicle and the like.

<<Effect>>

In connection with the reactor 1 structured as described above, allowing the line 71 of the sensor 7 to be hooked on the hook portion 43a provided at the side wall portion 41A of the case 4, the line 71 can be restricted from shifting, and displacement, coming off, or any damage which may otherwise be done to the sensor 7 as a result of routing the line 71 can be prevented. Further, even when the line 71 has a redundant length, the possibility of the line 71 itself being roughly routed and tangled can be reduced. In particular, the reactor 1 is provided with the hook portion not only at the case 4 but also at the insulator 5A as the hook portion 55. Thus, the line 71 can be restricted from shifting by a plurality of hook portions 43a and 55. This feature also contributes toward preventing the sensor 7 from being displaced or coming off. Accordingly, the reactor 1 can maintain the sensor 7 at a prescribed position for a long period. Further, with the reactor 1, the desired physical quantity (here, the temperature of the coil 2) can be properly measured by the sensor 7 disposed at a prescribed position, and feedback control or the like can be performed in an excellent manner based on the measured physical quantity.

In particular, with the reactor 1, since the insulator 5A is provided with the storage portion for the sensor 7, the sensor 7 can be easily positioned at a prescribed position. Accordingly, in connection with the reactor 1, the sensor 7 can be positioned properly at a prescribed position and, furthermore, the disposition position can be maintained for a long period by the hook portion 43a.

Further, since the hook portions 43a and 55 are respectively integrally molded with the side wall portion 41A of the case 4 and the insulator 5A itself, the number of components is fewer as compared to the case where the hook portions are separate members. Furthermore, since the hook portions 43a and 55 can be molded with ease through injection molding of resin or the like, excellent productivity is exhibited with the reactor 1.

Still further, since the reactor 1 includes the case 4, the combined product 10 can be protected from the external environment and can be mechanically protected. Furthermore, despite it includes the case 4, the reactor 1 is lightweight because the side wall portion 41A is made of resin (in particular, an insulating resin). In addition, the interval between the outer circumference face of the coil 2 and the inner circumference face of the side wall portion 41A can be narrowed as compared to the case where the side wall portion made of an electrically conductive material is used. Therefore, the reactor 1 can be small in size. Further, since the reactor 1 includes the insulator 5A, insulation between the coil 2 and the magnetic core 3 can be enhanced.

In addition, since the joining layer 42, which includes the heat dissipation layer exhibiting excellent thermal conductivity, i.e., higher than 2 W/m·K, is interposed between the bottom plate portion 40 made of a metal material and the coil 2, the reactor 1 can efficiently transfer heat from the coil 2 and the magnetic core 3 during operation to an installation target such as a cooling base via the bottom plate portion 40 and the heat dissipation layer. Accordingly, the reactor 1 possesses an excellent heat dissipating characteristic. When the entire joining layer 42 is made of an insulating material whose thermal conductivity is higher than 2 W/m·K, a reactor possessing an even excellent heat dissipating characteristic can be obtained.

Further, since the bottom plate portion 40 being brought into contact with the coil 2 is made of a material exhibiting an excellent thermal conductivity such as aluminum, the reactor 1 possesses an even excellent heat dissipating characteristic. Still further, though the bottom plate portion 40 of the reactor 1 is made of a metal material (an electrically conductive material), since at least the in-contact place of the joining layer 42 relative to the coil 2 is made of an insulating material, insulation between the coil 2 and the bottom plate portion 40 can be secured even when the joining layer 42 is very thin, e.g., as thin as 0.1 mm. In particular, in this example, since the entire joining layer 42 is made of an insulating material, the coil 2 and the bottom plate portion 40 can be fully insulated from each other even when the joining layer 42 is thin. Further, thanks also to the joining layer 42 being thin, heat from the coil 2 and the like can be transferred with ease to the installation target via the bottom plate portion 40. Hence, the reactor 1 possesses an excellent heat dissipating characteristic. Further, in this example, since the entire joining layer 42 is made of an insulation adhesive agent, excellent adhesion between the coil 2 or the magnetic core 3 and the joining layer 42 is achieved. This feature also facilitates transfer of heat from the coil 2 and the like to the joining layer 42, and hence the reactor 1 possesses an excellent heat dissipating characteristic. In addition, in this example, use of a coated rectangular wire as the wire $2w$ secures the fully wide contact area between the coil 2 and the joining layer 42. This feature also contributes to the reactor 1 possessing an excellent heat dissipating characteristic. Further, as described above, thanks also to the joining layer 42 being thin, the interval between the coil 2 and the bottom plate portion 40 can be narrowed, and hence the reactor 1 is small in size.

In addition, the reactor 1 employs the structure in which the bottom plate portion 40 and the side wall portion 41A are separate members independent of each other, which are to be combined and integrated by fixation members. Accordingly, despite provision of the hook portion 43a, the combined product 10 can be stored in the case 4 with ease. Further, since the joining layer 42 can be formed at the bottom plate portion 40 in the state where the side wall portion 41A is removed, the joining layer 42 can be formed with ease. Thus, the reactor 1 exhibits excellent productivity.

In the following, with reference to FIG. 5, a description will be given of other embodiments as to the hook portion of the side wall portion. Here, the description will be given solely of the hook portion of the side wall portion, and the description of the other structures will not be given. Note that, in FIGS. 5 and 6 which will be referred to later, for the sake of convenience, only the area near the opening portion of the side wall portion is shown, and the structures relating to the terminal block are omitted. Further, in any of the embodiments shown in FIGS. 5 and 6, the disposition position of the hook portion is of an exemplary nature, and the position along the axial direction of the coil and the position in the laterally juxtaposed direction of the coil element can be changed as appropriate.

Second Embodiment

In the first embodiment, a description has been given of the mode in which one hook portion 43a is provided to the side wall portion 41A. Alternatively, as a side wall portion 41α shown in FIG. 5 (A), a plurality of hook portions 43a, 43b, and 43c can be provided. Provision of a plurality of hook portions 43a, 43b, and 43c makes it possible to use, for example, the hook portions 43a and 43b for hooking the line of a temperature sensor, and to use the hook portion 43c for hooking the line of a current sensor. In this manner, in accordance with the number of sensors stored in the case, the number of pieces of the hook portions can be changed. Further, use of a plurality of hook portions in hooking the line of one sensor makes it difficult for the line to shift. For example, even without the storage portion for the sensor formed by the insulator, the state where the sensor is disposed at a prescribed position can be maintained by employing the side wall portion having a plurality of hook portions. Further, as shown with the side wall portion 41α, variations in the opening direction of the C-shape or L-shape among the plurality of hook portions 43a and 43b also make it difficult for the line to shift, by devising the manner of hooking the line. For example, by routing the line as follows, the line can be strongly fixed: beneath the hook portion 55 (FIG. 1) of the insulator 5A (FIG. 1) ⇒ from beneath the hook portion 43a to above ⇒ from beneath the hook portion 43b to above, to be hooked thereon.

Note that the shape of the hook portions 43a, 43b, and 43c is of an exemplary nature. Though the hook portions 43b and 43c are each an L-shaped piece, needless to say, they may each be a C-shaped piece similarly to the hook portion 43a. Further, here, though the hook portions 43a, 43b, and 43c are provided so as to be flush with the overhanging portion of the side wall portion or the terminal block, and to be positioned on the inner side of the opening portion, it is also possible that at least one hook portion is provided so as to project upward from the opening portion of the side wall portion 41α, or outward (in the right-left direction) from the opening portion. By setting all the hook portions to be positioned inside of the opening portion and to be flush with the overhanging portion of the side wall portion 41α and the terminal block as described above, the size of the reactor in the top-bottom direction and the right-left direction can be reduced. Employing the hook portions projecting upward or in the right-left direction, the hooking work of the line is facilitated.

Third Embodiment

In the first and second embodiments, a description has been given of the mode in which the hook portions 43a, 43b, and 43c are provided at the edge portion of the overhanging portion of the side wall portion 41A or 41α and the edge portion of the terminal block. Alternatively, as a side wall portion 41B shown in FIG. 5 (B), in the periphery of the quadrangle structuring the opening portion, the hook portion 43a can be provided at the edge being parallel to the axial direction of the coil. The disposition position of the hook portion provided at the side wall portion in this manner can also be changed as appropriate in accordance with the disposition position of the sensor.

Fourth Embodiment

In the first to third embodiments, a description has been given of the hook portions each being a C-shaped or L-shaped band piece. Alternatively, as a side wall portion 41C shown in FIG. 5 (C), through holes provided at appropriate positions of the side wall portion 41C can be used as hook portions 44a and 44b for the line of the sensor. Here, the hook portion 44a is formed by a through hole provided at the overhanging portion itself of the side wall portion 41C, and the hook portion 44b is formed by a through hole provided at a tongue piece projecting upward from the opening portion at the periphery forming the opening portion of the side wall portion 41C. Provision of the tongue piece projecting into the space above the case facilitates the hooking work of the line. Furthermore, even in the mode in which a sealing resin is included, trouble such as leakage of the sealing resin from the through hole will not arise.

Since the hook portions are formed by the through holes as the hook portions 44a and 44b, the line does not come off easily. Accordingly, in this mode, the line can be surely retained and it is easy to restrict the line from shifting. Hence, it is easy to prevent the sensor from being displaced or coming off. Further, in the case where a plurality of through holes are provided as the hook portions, allowing the through holes to be differently oriented, the line inserted through the through holes can be meandered and hooked. This feature makes it difficult for the line to shift.

Fifth Embodiment

Alternatively, as a side wall portion 41D shown in FIG. 5 (D), at least a pair of projections projecting upward from the opening portion of the side wall portion 41D can be used as a hook portion 45. The distance between the projections should be selected in accordance with the width of the line. For example, a distance being slightly smaller (narrower) than the line is preferable, because such a distance allows the line to be clamped. Allowing three or more projections to be juxtaposed to one another, for example, the line can be meandered and hooked. Thus, the line can be strongly fixed. Further, provision of the hook portions (the projections) so as to project into the space above the case facilitates the hooking work of the line, as described above.

In another possible mode, a plurality of hook portions of different shapes may be provided by combining the hook portions of various shapes according to the first to fifth embodiments.

Sixth Embodiment

In the first embodiment, a description has been given of the structure in which the insulator 5A includes the storage portion for the sensor 7. In another possible structure, as a side wall portion 41E shown in FIG. 6, the side wall portion 41E may include a storage portion 47 for the sensor 7.

In connection with the side wall portion 41E, a cross-shaped bridge portion 48 is integrally molded with the side wall portion 41E so as to bridge between opposing peripheral sides, in the peripheral sides of the quadrangle structuring the opening portion. The cross-shaped intersection portion is provided with a bottomed tubular element extending downward in the top-bottom direction, so as to be inserted between the coil elements 2a and 2b when the side wall portion 41E is disposed around the coil 2. This tubular element is used as the storage portion 47. The storage portion 47 is provided with a vertical hole 46 having a diameter enough for the sensor 7 to be inserted. Note that, in this example, though the cross-shaped bridge portion 48 is provided, the shape is not limited to the cross shape so long as the bridge portion 48 is capable of supporting the storage portion 47. For example, it may be a straight bridge portion. Further, the storage portion 47 may be structured to partially expose the sensor 7 so long as the sensor 7 is supported. For example, the storage portion may be a tubular element having a window, or a through tubular element not being bottomed. Since the sensor 7 is partially exposed, the heat of the coil 2 can be sensed with ease.

Allowing the sensor 7 to be inserted into the vertical hole 46, the sensor 7 can be disposed at a prescribed position between the coil elements 2a and 2b. Further, allowing the line 71 connected to the sensor 7 to be hooked on the hook portion 43b and the hook portion 43c of the side wall portion 41E, the line 71 can be restricted from shifting. Further, since the storage portion 47 is made of an insulating resin, the storage portion 47 can function also as a partition portion insulating between the coil elements 2a and 2b as being interposed between the coil elements 2a and 2b. Accordingly, in this mode, an insulator with no partition portion can be used, and hence the shape of the insulator can be simplified. Alternatively, when restriction of the line 71 from shifting is realized by, e.g., slightly narrowing the opening portion of the vertical hole 46, the vertical hole 46 itself can function as the hook portion. In this case, the hook portions 43b and 43c can be dispensed with. Alternatively, in addition to the vertical hole 46 functioning as the hook portion, the hook portion 43b and 43c can also be provided.

Seventh Embodiment

In the first embodiment, a description has been given of the structure in which the insulator 5A includes the storage portion for the sensor 7, and the sensor 7 is disposed diagonally relative to the axial direction of the coil 2 (forming an acute angle or an obtuse angle). Alternatively, as an insulator 5B shown in FIG. 7, the shape of the partition portions 53a and 53b may be varied from each other to obtain a storage portion with which the sensor 7 is disposed perpendicularly to both the axial direction of the coil and the laterally juxtaposed direction of the coil element (here, along the top-bottom direction).

Figure 7:
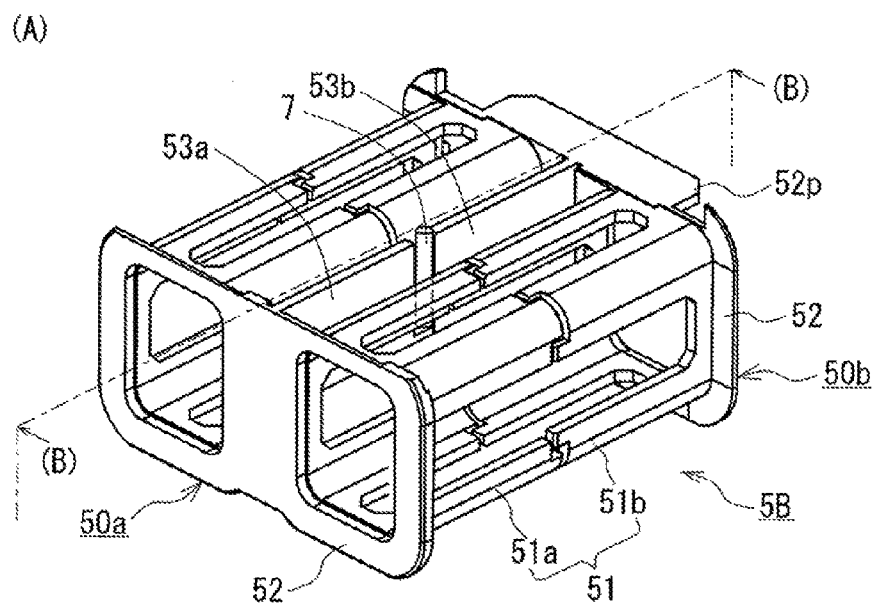
FIG. 7 shows other mode of the insulator, in which (A) is a perspective view and (B) is a cross-sectional view taken along B-B in (A).
Figure 7:
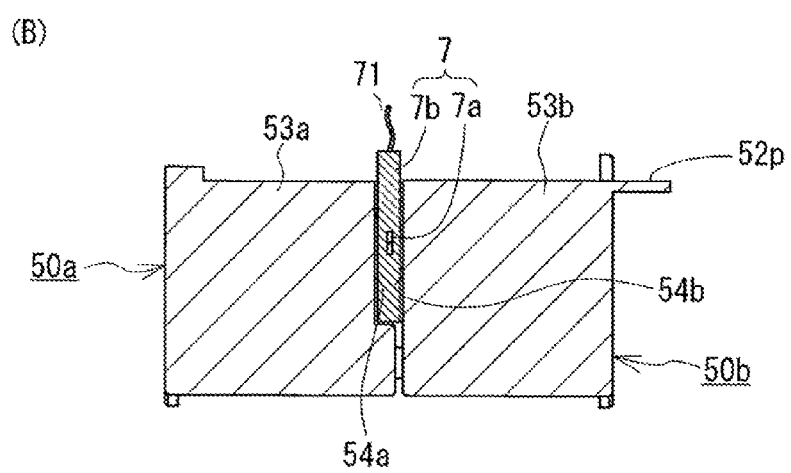

In this example, as shown in FIG. 7 (B), the partition portion 53a of the one divided piece 50a is L-shaped; the two end faces arranged in an L-shape form the storage forming portion 54a; the partition portion 53b of the other divided piece 50b is quadrangular plate-shaped; and the end face of the other divided piece 50 serves as the storage forming portion 54b. When the divided pieces 50a and 50b are combined, a space having a quadrangular cross section extending in the top-bottom direction is provided by the storage forming portion 54a of the partition portion 53a and the storage forming portion 54b of the partition portion 53b. In this space, as shown in FIG. 7 (B), the sensor 7 can be stored. With the insulator 5B, one end face forming the storage forming portion 54a of the one divided piece 50a (here, the face in parallel to the axial direction of the coil (the face-up end face in FIG. 7)) can be used as the stopper of the sensor 7. By adjusting the position of the one end face, the sensor 7 can be disposed at a prescribed position in the top-bottom direction of the coil elements 2a and 2b (FIG. 2 and others).

Use of the insulator 5B according to the seventh embodiment makes it possible to, similarly to the first embodiment, hold the sensor 7 by the storage portion for the sensor 7. Furthermore, the sensor 7 can be disposed at the storage portion with ease.

Eighth Embodiment

In the first embodiment, a description has been given of the structure in which the sensor 7 is disposed diagonally relative to the axial direction of the coil 2 (forming an acute angle or an obtuse angle). In the seventh embodiment, a description has been given of the structure in which the sensor 7 is disposed perpendicularly to the axial direction of the coil 2. In addition, as an insulator 5C shown in FIG. 8, the shape of the partition portions 53a and 53b can be varied such that the sensor 7 is disposed along the axial direction of the coil.

Figure 8:
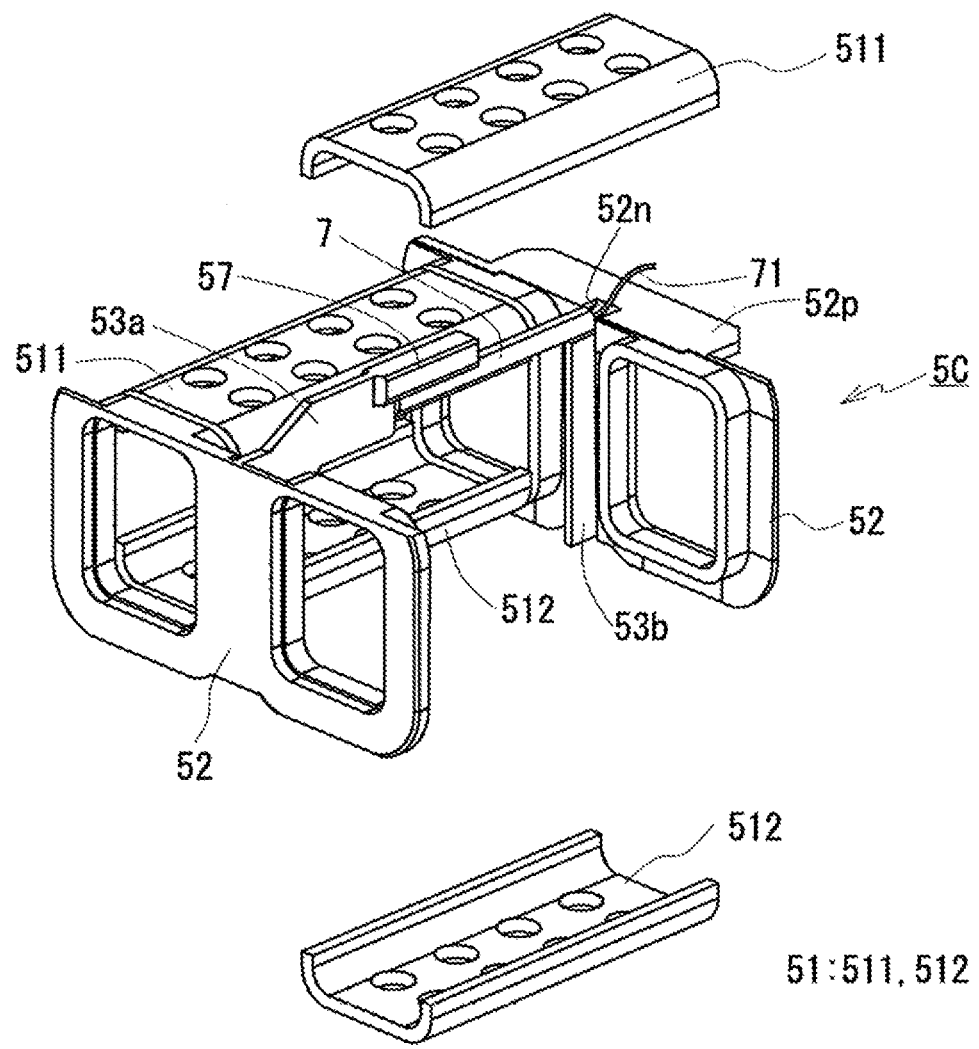
FIG. 8 is a perspective view showing another mode of the insulator.

Further, the insulator 5C shown in FIG. 8 is in the mode in which a pair of sleeve-like portions 51 disposed at the inner core portions and a pair of frame plate portions 52 disposed to clamp the sleeve-like portion 51 are separate members.

Each of the sleeve-like portions 51 shown in FIG. 8 is formed into a sleeve shape by a combination of a pair of divided sleeve pieces 511 and 512, each having a ]-shaped cross section. The divided sleeve pieces 511 and 512 can be divided in the direction being perpendicular (top-bottom direction) to the axial direction of the coil. With this structure, the divided sleeve pieces 511 and 512 can be disposed at the outer circumference of the inner core portions with ease, and hence excellent assemblability is exhibited. The divided sleeve pieces 511 and 512 do not engage with each other. Only part of the inner core portions (chiefly a pair of opposing faces) is covered by the divided sleeve pieces 511 and 512, and the other part is exposed. Further, the divided sleeve pieces 511 and 512 have through holes penetrating through the front and back sides. In these holes also, the inner core portions are partially exposed. Accordingly, in the mode where the insulator 5C and the sealing resin are included, similarly to the first embodiment, the contact area between the inner core portion and the sealing resin can be increased, and furthermore, air can be expelled with ease. Note that, in connection with the sleeve-like portion, the divided sleeve pieces 511 and 512 may not necessarily be integrated so long as a prescribed distance can be maintained between the coil elements and the inner core portions. However, when they are provided with the engaging portions and integrated with each other, the divided sleeve pieces can be positioned relative to each other with ease. Alternatively, the sleeve-like portion can be structured by an insulating tubing or the like, as described above.

The frame plate portions 52 included in the insulator 5C are, similarly to the first embodiment, each a B-shaped flat plate having a pair of opening portions. Each of the frame plate portions 52 is provided with short tubular portions projecting from the side where the coil is disposed. When the insulator 5C is assembled, the end faces of the tubular portions and the end faces of the divided sleeve pieces 511 and 512 are brought into contact with each other. Accordingly, over the entire length of the inner core portions, the insulator 5C exists. Between the short tubular portions of the one (the left one in FIG. 8) frame plate portion 52, the L-shaped partition portion 53a is provided. One side of the L-shape is disposed along the axial direction of the coil. As shown in FIG. 8, part of the one side of the L-shape is disposed to cover the sensor 7, and functions as a sensor stopper 57. The other (the right one in FIG. 8) frame plate portion 52 is provided with the band-like partition portion 53b and the pedestal 52p. The length of the band-like partition portion 53b in the axial direction is short, and the partition portions 53a and 53b are not brought into contact with each other when the insulator 5C is assembled. Then, the corner formed by the band-like partition portion 53b and the flat plate-like pedestal 52p is cut off. In this notch 52n, the end of the sensor 7 (the end coupled with the line 71) is disposed, and functions as the storage portion.

In the mode in which the insulator 5C is included, the sensor 7 disposed in the space formed between the coil elements 2a and 2b (FIG. 2 and others) has its one end side region abutted on the end face of the partition portion 53a of the one frame plate portion 52 and supported. The other end side region (the end side region coupled to the line 71) of the sensor 7 is fitted into the notch 52n, and supported by the end face of the partition portion 53b. Further, the one end side region of the sensor 7 is pressed toward the coil by the sensor stopper 57.

Use of the insulator 5C according to the eighth embodiment facilitates disposition of the sensor 7 at a prescribed position. Further, by allowing the line 71 to be hooked on the hook portion of the case, the disposition position of the sensor 7 can be maintained with ease.

Ninth Embodiment

The reactor according to any of the first to eighth embodiments may be used, for example, as a constituent component of a converter mounted on a vehicle or the like, or as a constituent component of a power converter apparatus including the converter.

Figure 9:
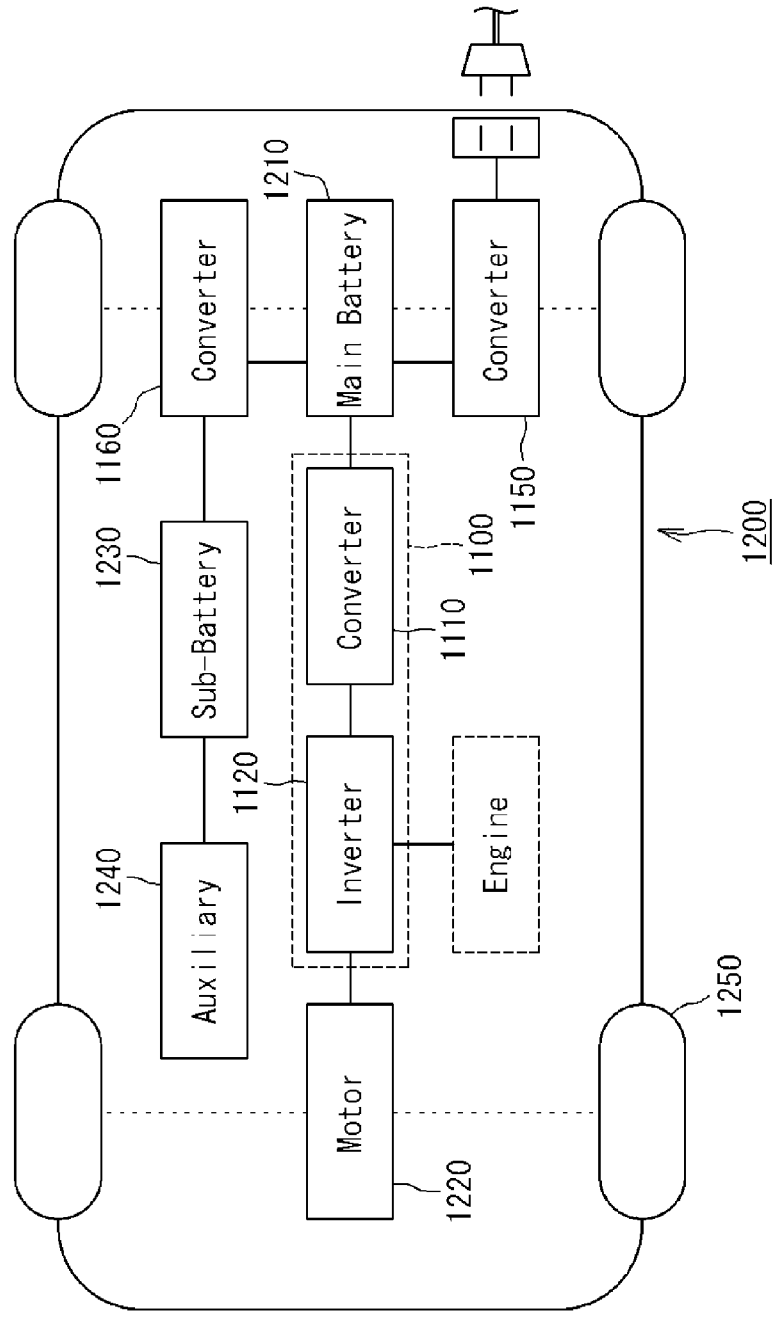
FIG. 9 is schematic structure diagram schematically showing a power supply system of a hybrid vehicle.

For example, as shown in FIG. 9, a vehicle 1200 such as a hybrid vehicle or an electric vehicle includes a main battery 1210, a power converter apparatus 1100 connected to the main battery 1210, and a motor (a load) 1220 driven by power supplied from the main battery 1210 and serves for traveling. The motor 1220 is representatively a three-phase alternating current motor. The motor 1220 drives wheels 1250 in the traveling mode and functions as a generator in the regenerative mode. In the case of a hybrid vehicle, the vehicle 1200 includes an engine in addition to the motor 1220. Note that, though an inlet is shown in FIG. 9 as a charging portion of the vehicle 1200, a plug may be included.

The power converter apparatus 1100 includes a converter 1110 connected to the main battery 1210, and an inverter 1120 connected to the converter 1110 to perform interconversion between direct current and alternating current. When the vehicle 1200 is in the traveling mode, the converter 1110 shown in this example steps up a DC voltage (input voltage) of about 200 V to 300 V of the main battery 1210 to about 400 V to 700 V, and supplies the inverter 1120 with the stepped up power. Further, in the regenerative mode, the converter 1110 steps down the DC voltage (input voltage) output from the motor 1220 through the inverter 1120 to a DC voltage suitable for the main battery 1210, such that the main battery 1210 is charged with the DC voltage. When the vehicle 1200 is in the traveling mode, the inverter 1120 converts the direct current stepped up by the converter 1110 into a prescribed alternating current and supplies the motor 1220 with the alternating current. In the regenerative mode, the inverter 1120 converts the AC output from the motor 1220 into direct current, and outputs the direct current to the converter 1110.

Figure 10:
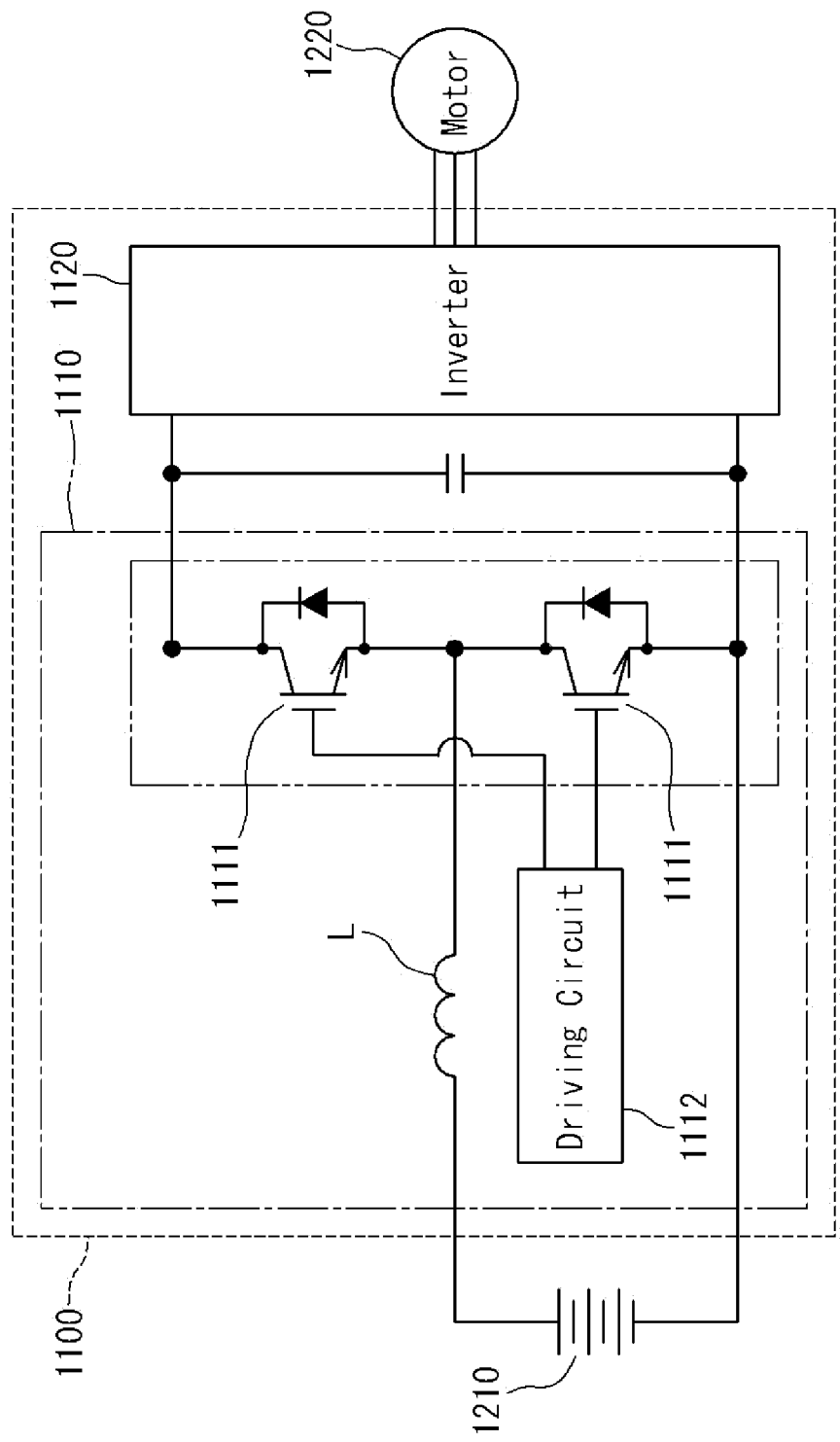
FIG. 10 is a schematic circuit diagram showing an exemplary power converter apparatus of the present invention including a converter of the present invention.

As shown in FIG. 10, the converter 1110 includes a plurality of switching elements 1111, a driver circuit 1112 that controls operations of the switching elements 1111, and a reactor L. The converter 1110 converts (here, performs steps up and down) the input voltage by repetitively performing ON/OFF (switching operations). As the switching elements 1111, power devices such as FETs or IGBTs are used. The reactor L uses a characteristic of a coil that disturbs a change of current which flows through the circuit, and hence has a function of making the change smooth when the current is increased or decreased by the switching operation. The reactor L is the reactor according to any of the first to eighth embodiments. Since the reactor 1 and others are included, the physical quantity of the power converter apparatus 1100 and the converter 1110 can be properly measured by the sensor 7, and the measured physical quantity can be used.

Note that the vehicle 1200 includes, in addition to the converter 1110, a power supply apparatus-use converter 1150 connected to the main battery 1210, and an auxiliary power supply-use converter 1160 connected to a sub-battery 1230 serving as a power source of auxiliary equipment 1240 and to the main battery 1210, to convert a high voltage of the main battery 1210 to a low voltage. The converter 1110 representatively performs DC-DC conversion, whereas the power supply apparatus-use converter 1150 and the auxiliary power supply-use converter 1160 perform AC-DC conversion. Some types of the power supply apparatus-use converter 1150 perform DC-DC conversion. For the reactor of each of the power supply apparatus-use converter 1150 and the auxiliary power supply-use converter 1160, a reactor that is structured similarly to the reactor 1 according to any of the first to eighth embodiments can be used, with its size and shape being changed as appropriate. Further, the reactor 1 according to any of the first to eighth embodiments can be used for a converter that performs conversion for the input power and that performs only stepping up or stepping down.

Note that the present invention is not limited to the embodiments described above, and any change can be made within a range not departing from the gist of the present invention.

INDUSTRIAL APPLICABILITY

The reactor of the present invention can be suitably used as a constituent component of a power converter apparatus, such as an in-vehicle converter (representatively a DC-DC converter) mounted on a vehicle such as a hybrid vehicle, an electric vehicle, a fuel cell vehicle, a plug-in hybrid vehicle and the like, or a converter of an air conditioner.

REFERENCE SIGNS LIST

1: REACTOR
10: COMBINED PRODUCT
2: COIL
2a, 2b: COIL ELEMENT
2r: COIL COUPLE PORTION
2w: WIRE
2e: END OF WIRE
3: MAGNETIC CORE
31: INNER CORE PORTION
31e: END FACE
31m: CORE PIECE
31g: GAP MEMBER
32: OUTER CORE PORTION
32e: INNER END FACE
4: CASE
40: BOTTOM PLATE PORTION
41A, 41B, 41C, 41D, 41E, 41α: SIDE WALL PORTION
42: JOINING LAYER
43a, 43b, 43c, 44a, 44b, 45: HOOK PORTION
46: VERTICAL HOLE
47: STORAGE PORTION
48: BRIDGE PORTION
400, 411: ATTACHING PORTION
400h, 411h: BOLT HOLE
410: TERMINAL BLOCK
410c: CONCAVE GROOVE
410p: POSITIONING PROJECTION
5A, 5B, 5C: INSULATOR
50a, 50b: DIVIDED PIECE
51: SLEEVE-LIKE PORTION
51a, 51b: SUPPORT PORTION
52: FRAME PLATE PORTION
52p: PEDESTAL
52n: NOTCH
53a, 53b: PARTITION PORTION
54a, 54b: STORAGE FORMING PORTION
55: HOOK PORTION
57: SENSOR STOPPER
511, 512: DIVIDED SLEEVE PIECE
6: GASKET
7: SENSOR
7a: HEAT SENSITIVE ELEMENT
7b: PROTECTIVE PORTION
71: LINE
8: TERMINAL FITTING
81a, 81b: JOINING PORTION
82h: THROUGH HOLE
83: POSITIONING HOLE
9: TERMINAL FIXING MEMBER
91: BOLT
1100: POWER CONVERTER APPARATUS
1110: CONVERTER
1111: SWITCHING ELEMENTS
1112: DRIVER CIRCUIT
L: REACTOR
1120: INVERTER
1150: POWER SUPPLY APPARATUS-USE CONVERTER
1160: AUXILIARY POWER SUPPLY-USE CONVERTER
1200: VEHICLE
1210: MAIN BATTERY
1220: MOTOR
1230: SUB-BATTERY
1240: AUXILIARY EQUIPMENT
1250: WHEELS

The invention claimed is:

1. A reactor, comprising:
a coil;
a magnetic core at which the coil is disposed; and
a case that stores a combined product made up of the coil and the magnetic core, wherein
the case includes a bottom plate portion on which the combined product is placed and a side wall portion that surrounds the combined product,
at least part of the side wall portion on an opening side is made of resin, and
a hook portion on which a line coupled to a sensor for measuring a physical quantity of the reactor is hooked is integrally molded with the opening side of the side wall portion by the resin so that the hook portion and the side wall portion are made of the same resin as an integral.

2. The reactor according to claim 1, wherein
the side wall portion is entirely made of an insulating resin, the side wall portion being a member independent of the bottom plate portion, and the side wall portion being integrated with the bottom plate portion by a fixation member.

3. The reactor according to claim 1, wherein
the combined product includes an insulator being interposed between the coil and the magnetic core, and
the insulator is integrally structured by a pair of divided pieces being combined, the reactor further comprises
a space that is formed as a result of the combination of the divided pieces, as a storage portion for the sensor.

4. The reactor according to claim 3, wherein
the coil includes a pair of coil elements,
the coil elements are juxtaposed to each other such that axes of the coil elements are in parallel to each other,
each of the divided pieces of the insulator is integrally molded with a partition portion disposed between the coil elements, and
the storage portion for the sensor is a space formed by the partition portions of the divided pieces when the divided pieces are combined.

5. The reactor according to claim 3, wherein
the divided pieces have engaging portions that engage with each other.

6. The reactor according to claim 1, wherein
the storage portion for the sensor is integrally molded with the side wall portion by the resin forming the side wall portion.

7. The reactor according to claim 1, wherein
the bottom plate portion is made of a metal material.

8. A converter, comprising:
a switching element;
a driver circuit that controls an operation of the switching element; and
a reactor that smoothes a switching operation, wherein
an input voltage is converted by the operation of the switching element, and
the reactor is the reactor according to claim 1.

9. A power converter apparatus, comprising:
a converter that converts an input voltage; and
an inverter that is connected to the converter and that performs interconversion between a direct current and an alternating current, wherein
a load is driven by power obtained by the conversion performed by the inverter, and
the converter is the converter according to claim 8.

10. The reactor according to claim 1, wherein
the hook portion is provided to project into an upper space of the coil from a periphery forming the opening portion of the side wall portion.

11. The reactor according to claim 1, wherein
the hook portion is provided for the single line, the hook portion containing a plurality of hook portions.

* * * * *